US012215852B2

(12) United States Patent
Glass

(10) Patent No.: US 12,215,852 B2
(45) Date of Patent: Feb. 4, 2025

(54) ILLUMINATED TRAFFIC SIGN ASSEMBLY WITH PANEL HAVING EMBEDDED PARTICLES

(71) Applicant: NightStar Traffic Solutions, Inc., Westminster, CO (US)

(72) Inventor: Mariteresa Boren Glass, Westminster, CO (US)

(73) Assignee: NIGHTSTAR TRAFFIC SOLUTIONS, INC., Westminster, CO (US)

( * ) Notice: Subject to any disclaimer, the term of this patent is extended or adjusted under 35 U.S.C. 154(b) by 0 days.

(21) Appl. No.: 18/375,896

(22) Filed: Oct. 2, 2023

(65) Prior Publication Data

US 2024/0175564 A1 May 30, 2024

Related U.S. Application Data

(63) Continuation-in-part of application No. 17/861,494, filed on Jul. 11, 2022, now abandoned, which is a continuation of application No. 17/184,475, filed on Feb. 24, 2021, now abandoned.

(60) Provisional application No. 62/980,534, filed on Feb. 24, 2020.

(51) Int. Cl.
*F21V 5/00* (2018.01)
*F21V 15/01* (2006.01)
*F21V 31/00* (2006.01)
*G02B 5/02* (2006.01)
*F21W 111/02* (2006.01)

(52) U.S. Cl.
CPC ............... *F21V 5/00* (2013.01); *F21V 15/012* (2013.01); *F21V 31/005* (2013.01); *G02B 5/0242* (2013.01); *F21W 2111/02* (2013.01)

(58) Field of Classification Search
CPC .............. G09F 13/049; G09F 13/18; G09F 2013/1813; G09F 2013/1831; G09F 2013/1836; G09F 2013/1872; G09F 2013/1881; G02B 5/0242; G02B 6/0041
See application file for complete search history.

(56) References Cited

U.S. PATENT DOCUMENTS

| | | |
|---|---|---|
| 3,464,133 A | 9/1969 | Poray |
| 5,138,783 A | 8/1992 | Forsse |
| 5,390,436 A * | 2/1995 | Ashall .................... B60K 35/60 362/618 |
| 5,453,855 A | 9/1995 | Nakamura et al. |
| 7,942,542 B1 * | 5/2011 | Dunn ...................... G09F 13/16 362/604 |
| 8,011,818 B2 * | 9/2011 | Negley .................... F21K 9/61 362/249.02 |
| 8,590,196 B2 | 11/2013 | Elliott et al. |
| 8,834,000 B2 * | 9/2014 | Kim ......................... G09F 3/14 362/609 |

(Continued)

*Primary Examiner* — Ismael Negron

(57) ABSTRACT

A traffic sign assembly includes a plurality of panels. At least one interior panel includes at least one light array configured to project light towards a middle portion of the interior panel and a plurality of particles within the interior panel body. Other panels may include filter panels, transparent panels, heat or moisture shielding panels, reflecting panels, and heat foil panels. The particles in the interior panel directs light from the light array such that the light shines outwardly from toward the front of the traffic sign assembly.

12 Claims, 25 Drawing Sheets

(56) References Cited

U.S. PATENT DOCUMENTS

| | | | | |
|---|---|---|---|---|
| 9,192,255 | B2* | 11/2015 | Burrous | G09F 15/0012 |
| 9,244,210 | B2* | 1/2016 | Sakamoto | G02B 6/0036 |
| 10,222,650 | B2* | 3/2019 | Kim | G09F 13/14 |
| 10,679,528 | B2* | 6/2020 | Szekely | G09F 13/18 |
| 11,170,673 | B2* | 11/2021 | Gamble | G09F 13/18 |
| 2011/0030252 | A1* | 2/2011 | Marinakis | G09F 7/10 |
| | | | | 362/183 |
| 2012/0304513 | A1 | 12/2012 | Gorelick | |
| 2013/0242608 | A1* | 9/2013 | Chen | G09F 13/18 |
| | | | | 362/611 |
| 2015/0075044 | A1* | 3/2015 | Nelson | G09F 13/0413 |
| | | | | 362/97.4 |
| 2016/0335933 | A1* | 11/2016 | Claire | A01K 63/06 |
| 2018/0314001 | A1 | 11/2018 | Veenstra et al. | |

* cited by examiner

ILLUMINATED TRAFFIC SIGN ASSEMBLY WITH PANEL HAVING EMBEDDED PARTICLES

CLAIM TO PRIORITY

This application is a continuation-in-part of U.S. patent application Ser. No. 17/861,494, which was filed on Jul. 11, 2022, which is a continuation of U.S. patent application Ser. No. 17/814,475, which was filed on Feb. 24, 2021, which claims priority to and the benefit of U.S. Provisional Application No. 62/980,534, which was filed on Feb. 24, 2020, titled LIGHT GATHERING AND DIFFUSING ILLUMINATED LENS, the disclosures of which are hereby incorporated by reference herein in their entirety.

INTRODUCTION

Driving is a common facet of present society. Often, drivers do not have sufficient light to be able to read and understand traffic signs at a distance. For example, drivers often drive during dusk, in tunnels, at nighttime, or in inclement weather where there is not enough ambient light to read traffic signs.

Current technology often relies on exterior lights to reflect light off of traffic signs. These "reflective" traffic signs aim to improve drivers' ability to view these traffic signs. Often, these "reflective" traffic signs have a light source that is directed to the traffic signs in order to provide light to the traffic signs. However, this solution remains suboptimal for smaller signs because lighting equipment typically used to light large traffic signs shines too much light than is needed for a small sign, thus wasting resources. For example, stop signs, road curve signs, and crosswalk signs are typically smaller and thus are difficult to light using traditional methods. Moreover, signs are often placed in remote places where it is difficult to supply adequate power to traditional lighting sources. As such, current solutions are cumbersome and/or ineffective when using traffic signs that are smaller than the traffic signs employed for major road infrastructures like highways and such.

Another current solution is to use the headlights of oncoming vehicles to illuminate these smaller and/or remote traffic signs. However, drivers often find that such reflected light is harsh, glaring, and/or too intense for the driver. Moreover, relying on the headlights of the vehicle requires the driver to have the vehicle's headlights powered on. Moreover, headlights are often not aligned in the direction or height of the traffic sign's reflectivity and/or cannot light them early enough (from a long enough distance) to provide time for drivers to react to the sign's warnings. Further, reflective signs are often hidden behind trees and other barriers. Currently, there are no illuminated traffic signs or traffic signs in which illumination aspects of the smaller signs (such as color, intensity, flash rate (and other properties) can be easily controlled and programmed, such as by an installer or operator.

It is with respect to these and other considerations that the technologies described herein have been developed. Also, although relatively specific problems have been discussed, it should be understood that the examples provided are not meant to be limited to solving the specific problems identified in the introduction or elsewhere.

SUMMARY

Aspects of the present technology include a traffic sign assembly. In examples, the traffic sign assembly includes an integrated light gathering and/or diffusing illuminated panel. In further examples, the panel absorbs, gathers, and/or accepts light from a light source integrated or coupled to the traffic sign assembly. In further examples, the panel redirects light from a light source (e.g., a light source coupled to the sides and/or top of the panel) such that the light shines outwardly from the front of the traffic sign assembly and/or away from the rear of the traffic sign.

In aspects of the technology, the light gathering and/or diffusing panel is coupled and/or operatively configured to work with one or more other devices, (e.g., other panels of the traffic sign assembly) such that the light emanating from the front of the traffic sign assembly is diffused or otherwise augmented and/or changed. Additionally, the one or more other panels (e.g., planar devices) may assist in limiting the brightness and/or intensity of said light prior to said light exiting the traffic sign assembly from the front of the traffic sign assembly. In additional examples, aspects of the present technology provide users with a light array capable of being controlled such that various properties of the light in the traffic sign assembly are controlled through the use of software, hardware, and/or firmware. In some applications, use of aspects of the present technology assists in limiting or preventing light from leaking through the rear of the traffic sign assembly. Additionally, use of aspects of the technology provides a device that reduces and/or eliminates glare, eye strain, and/or overly bright signage products in some applications. Various panels may be employed with an illuminated light panel to diffuse or focus the light towards the driver. One benefit, for certain applications, is that the traffic assembly reduces wasted light, reduces light pollution, and reduces the amount of power needed to generate the illumination internal to the sign.

In examples, a traffic sign assembly includes a light gathering and/or diffusing illuminated panel. The panel may be disposed within a casing assembly, such as between a first casing and a second casing. In a particular example, aspects of the technology include a traffic sign assembly having a first panel through a seventh panel and a gasket disposed within. Continuing with the example, the fourth panel may be operatively coupled to (or have integrated within) one or more light sources, such as a light array. For example, the one or more light sources may be coupled to at least a portion of the perimeter of the fourth panel. The light source may direct light into the side of the panel. The light may be directed substantially parallel to the face of the panel. A plurality of particles dispersed within the fourth panel may refract and/or reflect the light in a direction perpendicular to the plane of the face of the fourth panel.

In examples, the one or more light sources are in electronic communication with circuitry to control the light sources. Such control may be assisted by the use of a software application and/or firmware. The software application allows, in examples, the user to control various properties/parameters of the light sources (or a plurality of light sources). The circuitry may also be in electronic communication with a power source to power the one or more light sources (or a plurality of light sources). Examples of the present technology also include a gasket in between the first panel and the second panel. In some instances, the gasket functions as a light housing, and houses a light array and is coupled to a panel to direct light inwardly toward a center line of the panel. Additional/alternative examples of the present technology also include a graphic on one of the panels 1-7 such that the graphic is visible from the front face of the first casing.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claim hereof as well as the appended drawings. It is to be understood that both the foregoing introduction and the following detained description are exemplary and explanatory and are intended to provide further explanation of the innovative technology as claimed.

DETAILED DESCRIPTION

All illustrations of the drawings describe selected examples of the present technology and are not intended to limit the scope of the present technology. All references to "a user" or "users" refer to any individual or individuals who may use the technology.

Figure 1:
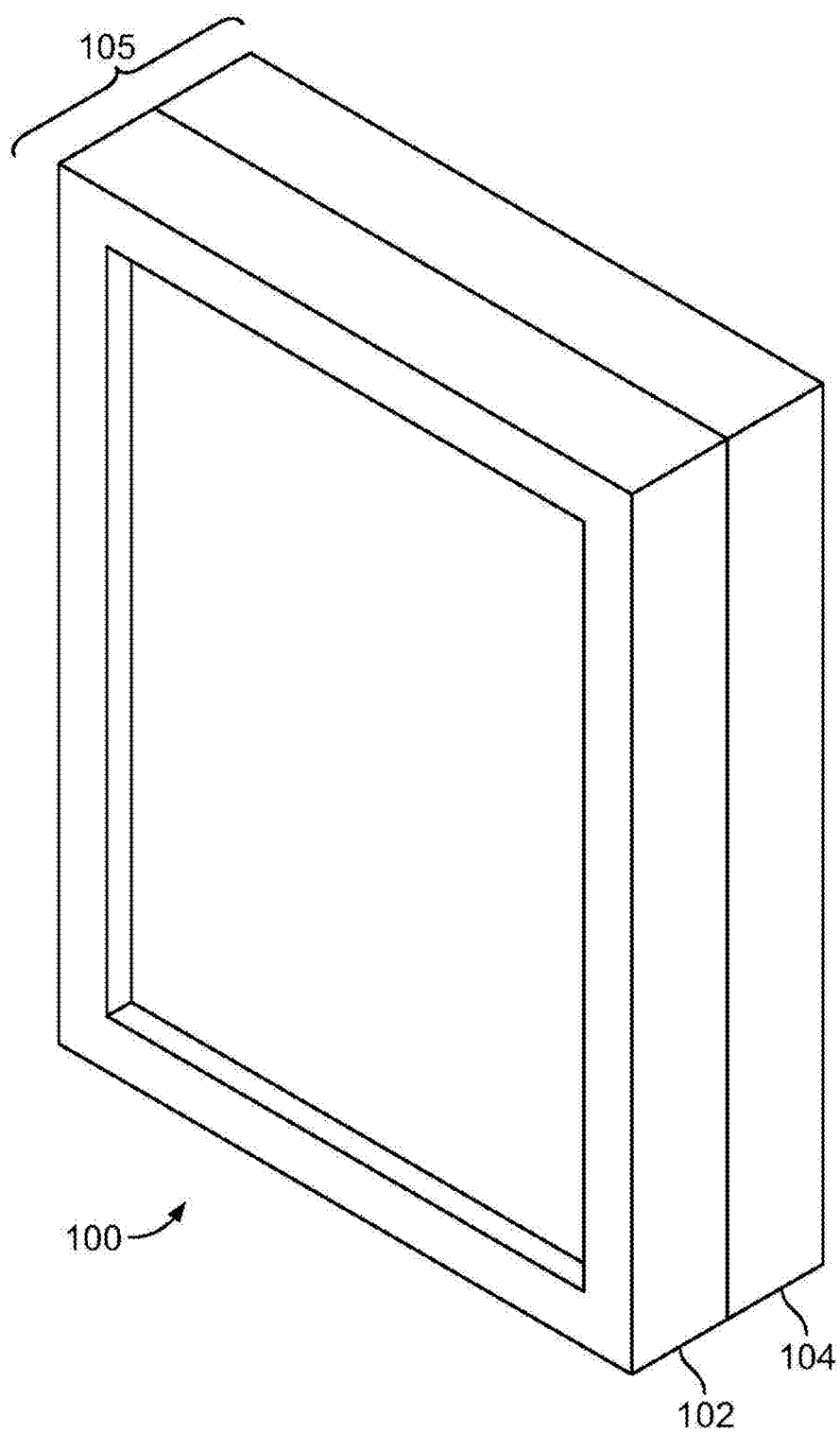
FIG. 1 is a perspective view of an example of a traffic sign assembly with a light-diffusing panel.
Figure 2:
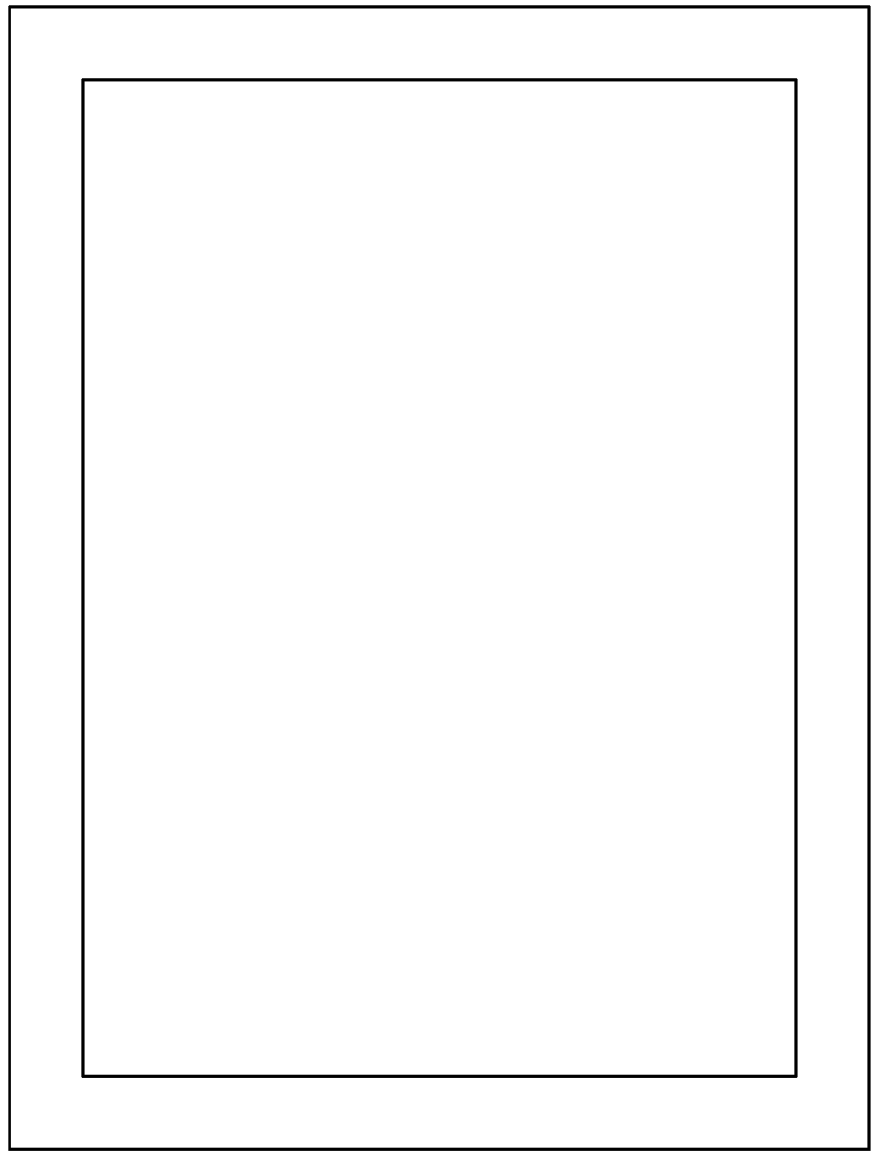
FIG. 2 is a front/rear view of an example of a traffic sign assembly with a light-diffusing panel.
Figure 3:
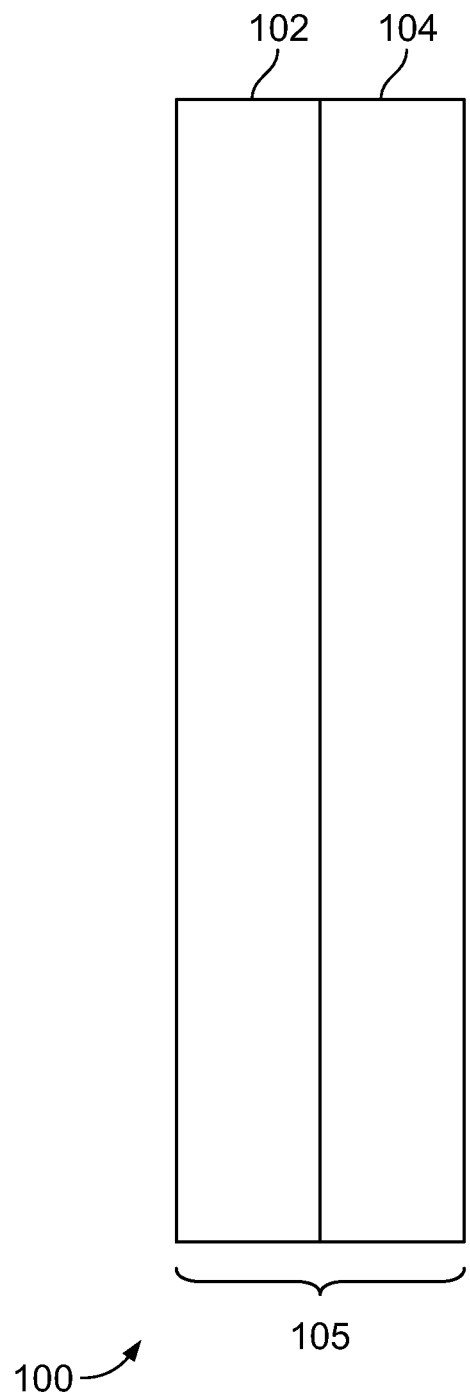
FIG. 3 is a right/left side view of an example of a traffic sign assembly with a light-diffusing panel.
Figure 4:
FIG. 4 is a top/bottom view of an example of a traffic sign assembly with a light-diffusing panel.
Figure 5:
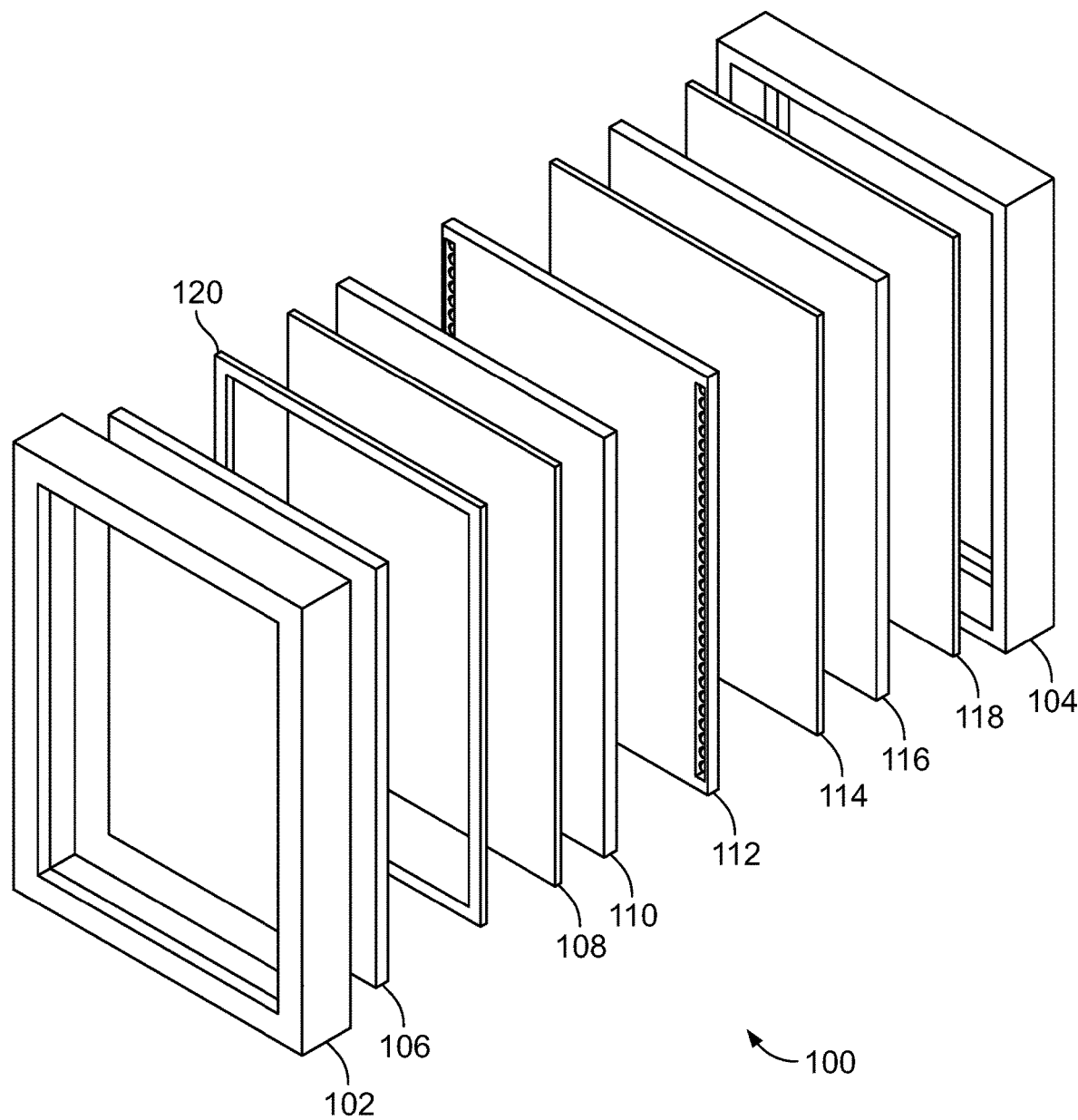
FIG. 5 is an exploded view of an example of a traffic sign assembly with a light-diffusing panel.
Figure 6:
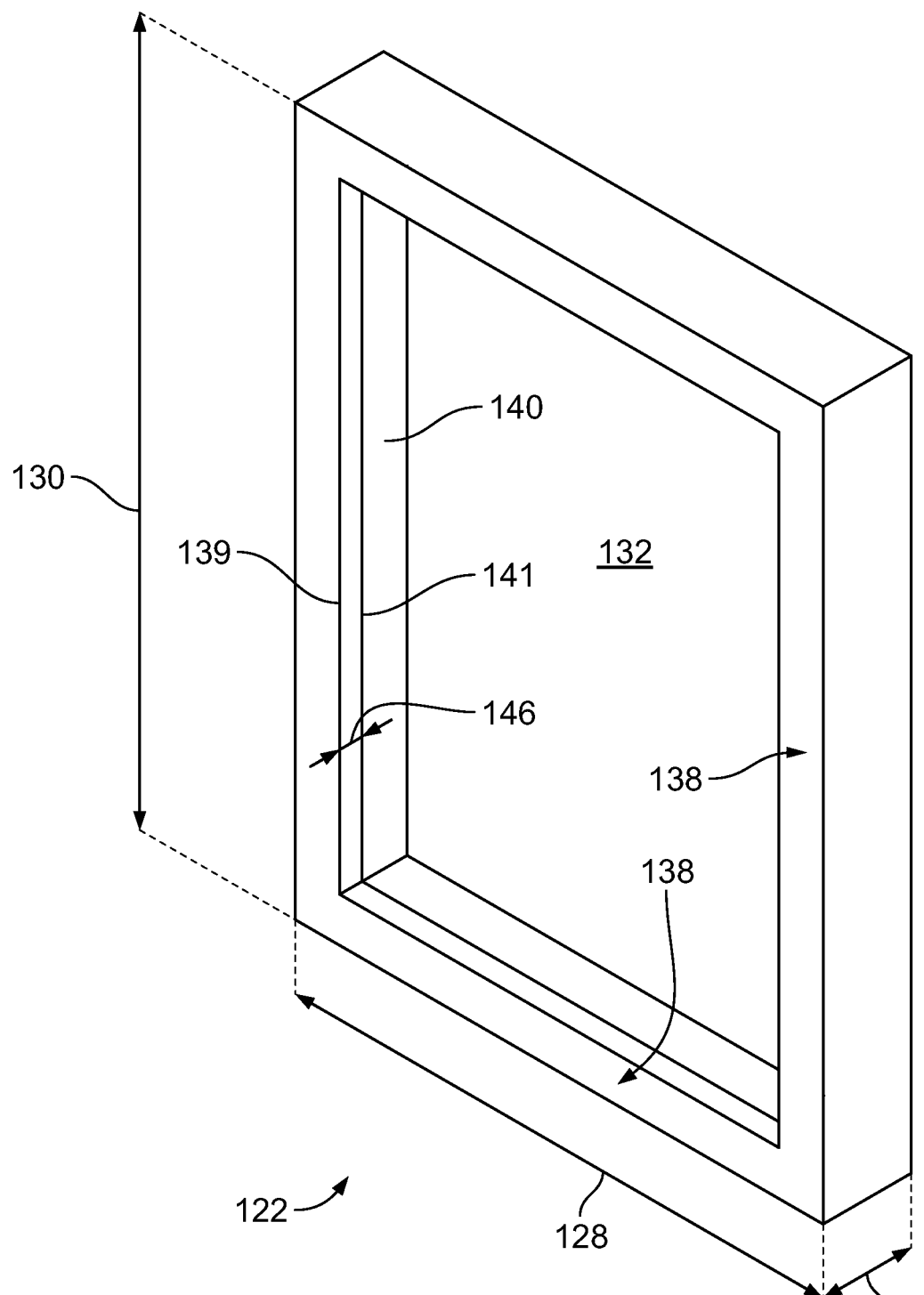
FIG. 6 is a perspective view of an example casing.
Figure 7:
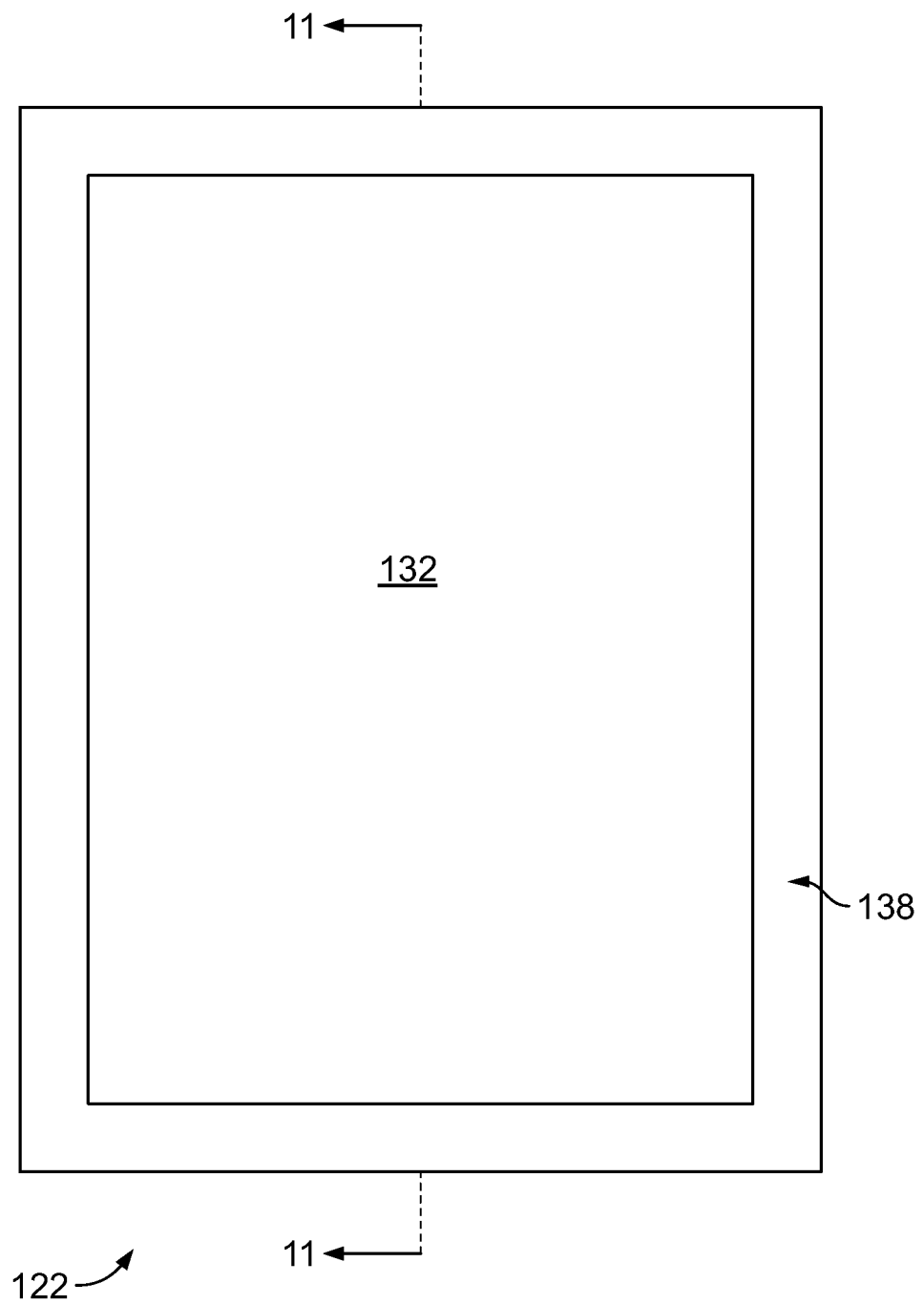
FIG. 7 is a front view of an example casing.
Figure 8:
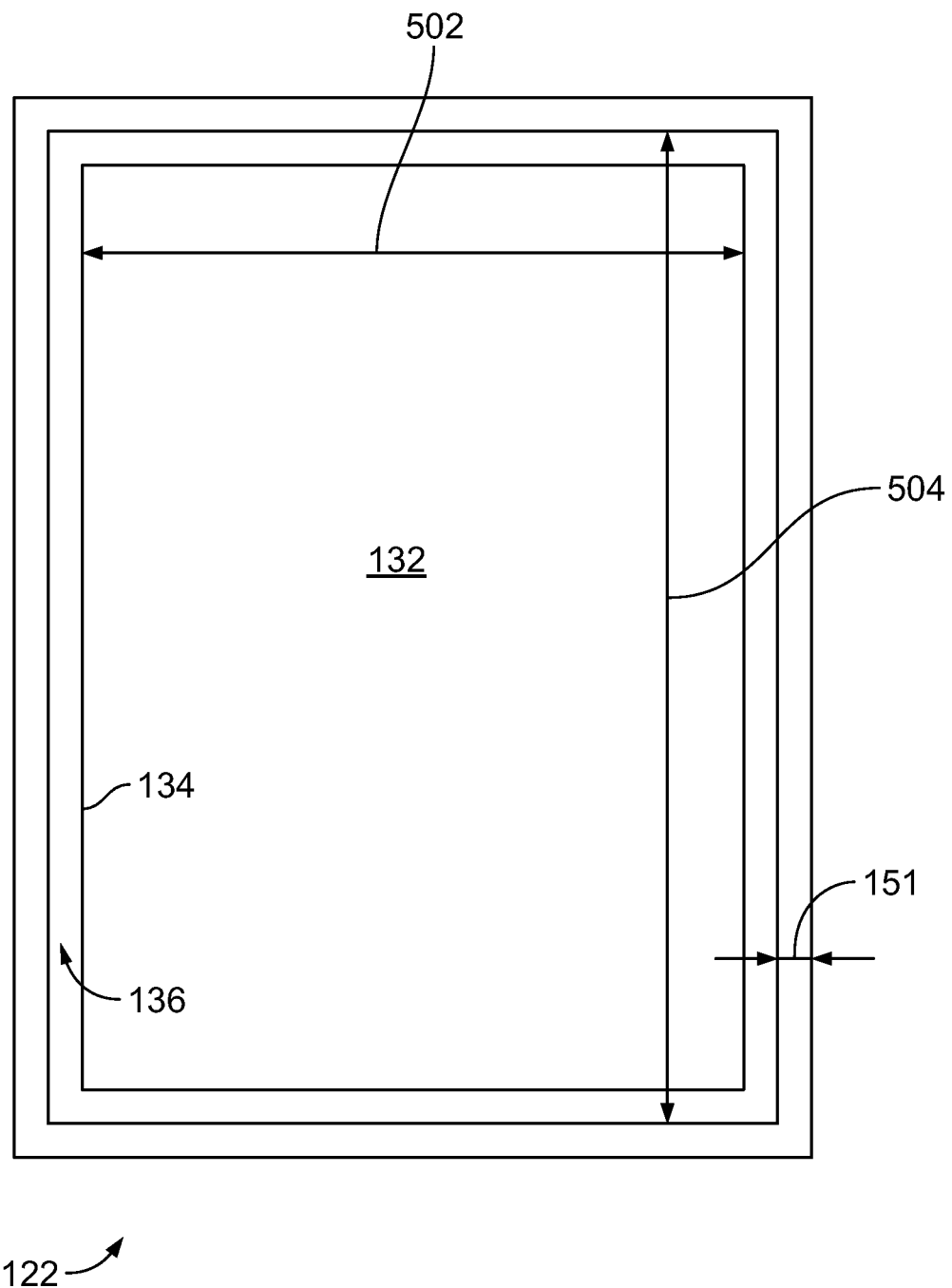
FIG. 8 is a rear view of an example casing.
Figure 9:
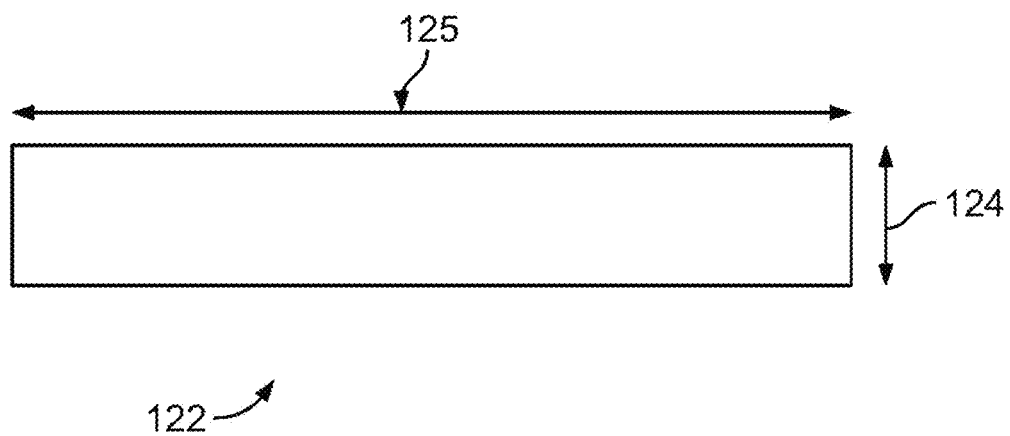
FIG. 9 is a top/bottom view of an example casing.
Figure 10:
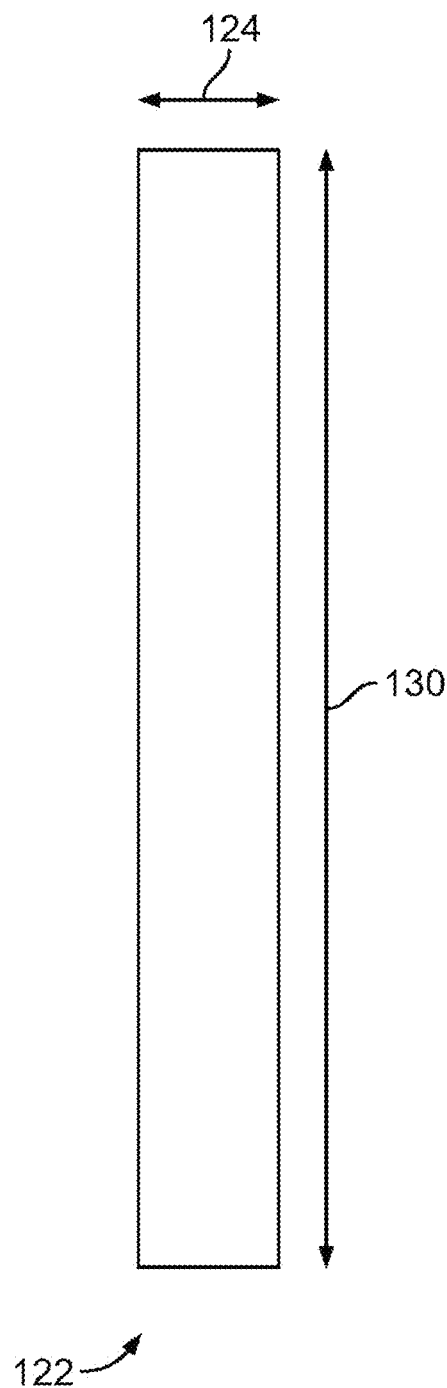
FIG. 10 is a right/left side view of an example casing.
Figure 11:
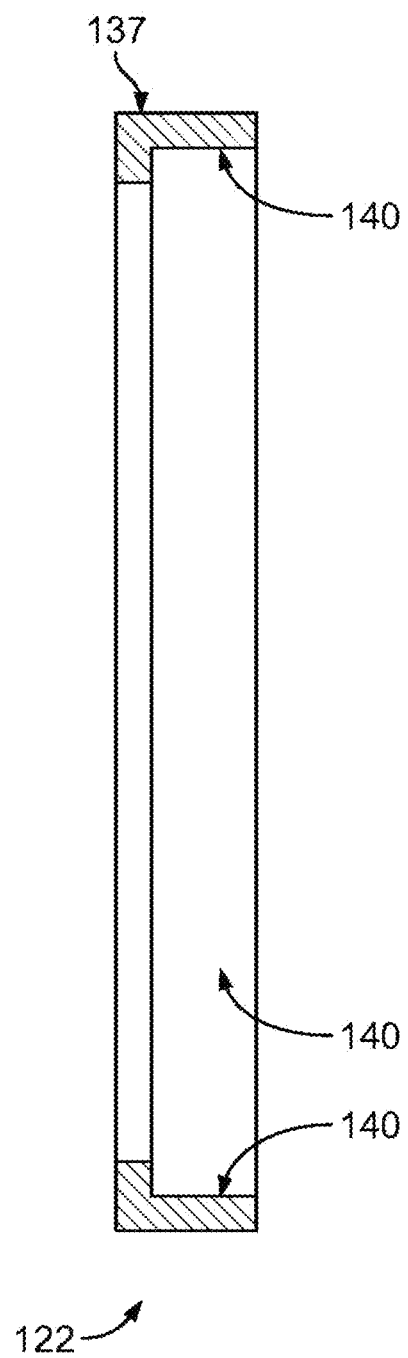
FIG. 11 is a cross-sectional view of an example casing taken along line 11-11 in FIG. 7.

With reference to FIGS. 1-5, FIGS. 1-5 illustrate various views of a traffic sign assembly with a light-diffusing panel 100. In particular, FIG. 1 is a perspective view of an example of a traffic sign assembly with a light-diffusing panel 100, FIG. 2 is a front/rear view of an example of a traffic sign assembly with a light-diffusing panel 100, FIG. 3 is a right/left side view of an example of a traffic sign assembly with a light-diffusing panel 100, FIG. 4 is a top/bottom view of an example of a traffic sign assembly with a light-diffusing panel 100, and FIG. 5 is an exploded view of an example of a traffic sign assembly with a light-diffusing panel 100.

Though the traffic sign assembly with a light-diffusing panel 100 illustrated in FIGS. 1-5 is depicted as a segmented cuboidal prism having the particular elements described, it will be appreciated that the traffic sign assembly with a light-diffusing panel and its components may be of any shape, size, material, features, type or kind, orientation, location, quantity, components, and arrangements of components that would allow the present traffic sign assembly with a light-diffusing panel to fulfill the objectives and intents described herein.

As illustrated, the traffic sign assembly with light diffusing panel 100 includes a first casing 102, a second casing 104, a first panel 106, a second panel 108, a third panel 110, a fourth panel 112, a fifth panel 114, a sixth panel 116, a seventh panel 118, and a gasket 120. The first panel 106, the second panel 108, the third panel 110, and the fourth panel 112 are, in examples, substantially transparent, having a transmittance value of at least 50%, at least 60%, at least 70%, at least 80%, or at least 90%. Other components, such as a circuit board with accompanying software or firmware for controlling the light array and/or lighting elements described herein may be affixed or integrated within the traffic sign assembly. In alternative/additional examples to the example illustrated, a graphical layer or element layer, (e.g., a semi-transparent, reflective thin film configured to be inserted between two panels or affixed on/coupled to a panel) is present. Such layer may comprise a graphic, a sign, an illustration, an image, other similarly-related objects, and/or a plurality of images or signs.

First casing 102 and second casing 104 are illustrated in FIGS. 1-5. As illustrated, first casing 102 and second casing 104 couple together and enclose panels 1-7, along with a gasket in examples, to form a casing assembly 105. In alternative/additional examples, the traffic sign assembly with light-diffusing panel 100 uses a single casing that wraps around panels 1-7, along with a gasket in examples. First casing 102 and second casing 104 may have a casing body 122. Casing body 122, an example of which is illustrated in FIGS. 6-11, may be of any shape, size, material, features, type or kind, orientation, location, quantity, components, and arrangements of components that would allow the casing body 122 to fulfill the objectives and intents of the present technology. In examples, for some applications, it is preferred that the casing body 122 be of a material that is strong, durable, tough, impact resistant, tamper proof, lightweight, ergonomically, and/or easily manufacturable. Such a material may include, but is not limited to, the following: aluminum, other similar metals, plastic, and/or any combination of the above-mentioned. For some applications, it may be preferred that the casing body width 124 be of a length about half of the width 126 of the traffic sign assembly with a light-diffusing panel 100. It may, for some applications, be preferred that the casing body 122 be of a length 128 and height 130 that is similar to the traffic sign assembly with a light-diffusing panel 100. It will be further appreciated that the casing body 122 may be configured to receive and/or couple to a panel. For example, the panel may be the first panel 106, the second panel 108, the third panel 110, the fourth panel 112, the fifth panel 114, the sixth panel 116, or the seventh panel 118. As illustrated, the first casing 102 has a casing body 122 adapted to receive the first panel 106.

Illustrated in FIGS. 6-8 and FIG. 11, the casing body 122 defines an opening 132 with a perimeter ledge 134. The perimeter ledge 134 has a first face 136 operatively configured to receive a panel, such as first panel 106 and seventh panel 118. For example, where the casing body 122 is that of first casing 102, casing body 122 is oriented and operatively configured to couple to the first panel 106 such that at least a portion of the first panel's 106 front face couples relatively flush with the first face 136 of the perimeter ledge 134. Similarly, where the casing body 122 is that of second casing body 104, casing body 122 is oriented and operatively configured to couple to the seventh panel 118 such that at least a portion of the seventh panel's 118 back face couples relatively flush with the first face 136 of the perimeter ledge 134. Coupling in each case may occur via compression, inference fit, threaded engagement, snap fit, magnetic coupling, hinge connection, latch mechanism, friction fit, resins, adhesives, glues, and the like.

In examples, the perimeter ledge 134 extends inwardly from the inner wall 140 of the casing body 122 proximate to the front edge 137 of the casing body 122 to form a substantially flush face 138. As illustrated, the perimeter ledge 134 is substantially uniform having an inner edge width 151 that is relatively consistent. This forms, as an example, an rectangular opening 132 having the same shape (as illustrated, a rectangle) of the casing body 122. In other examples, the ledge 134 need not form a substantially flush face 138, but may be offset from the front edge 137 of the casing, or otherwise. As illustrated, perimeter ledge 134 defines an opening 132 such that the casing body's width 124 is wider than a depth length 146, which depth length is defined by the length from the back edge 139 to the ledge back 141. In examples, it is preferred that the depth length 146 is slightly smaller than the casing body width 124. In some examples, it is preferred that the perimeter ledge 134 is a symmetrical race around the inner wall 140 of the casing body 122. The perimeter ledge 134 may be of any shape, size, material, features, type or kind, orientation, location, quantity, components, and arrangements of components that would allow the present perimeter ledge 134 to receive or couple to a panel. Indeed, in some examples, the perimeter ledge 134 forms a substantially flat plane with the back face of the casing body 122. The casing body 122 may be of any shape, size, material, features, type or kind, orientation, location, quantity, components, and arrangements of components that would allow the first casing body to fulfill the objectives and intents of the present technology. In examples, for some applications, it is preferred that the first casing body 122 be of a material that is strong, durable, tough, impact resistant, tamper proof, lightweight, ergonomically, and/or easily manufacturable. Such a material may include, but is not limited to, the following: aluminum, other similar metals, plastic, and/or any combination of the above-mentioned. For some applications, it may be preferred that the first width 124 of the casing body 122 be of a length about half of the width 126 of the traffic sign assembly with light-diffusing panel 100. It may, for some applications, be preferred that the casing body 122 be of a length 128 and height 130 that is similar to the height and length of the second casing 104. It will be further appreciated that the first panel 106, the second panel 108, the third panel 110, the fourth panel 112, the fifth panel 114, the sixth panel 116, and/or the seventh panel 118 may be secured together to form a panel assembly. This may occur via compression, inference fit, threaded engagement, snap fit, magnetic coupling, hinge connection, latch mechanism, friction fit, resins, adhesives, glues, and the like. In some examples, spacers may be used between one or more of the panels (such as between the sixth panel 116 and the seventh panel 118). Though illustrated as similar width, first casing 102 and second casing 104 need not be the same width.

Figure 15:
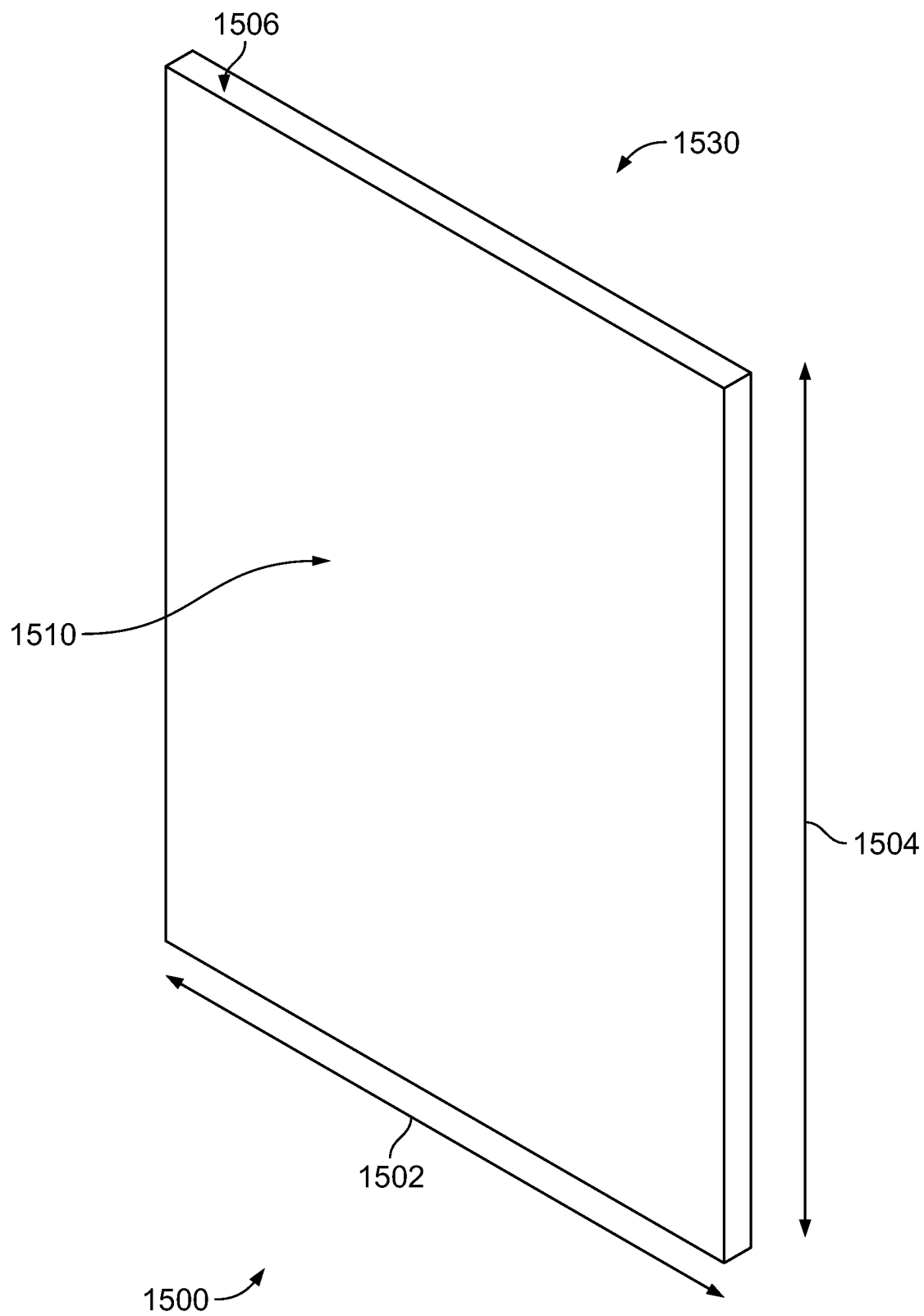
FIG. 15 is a perspective view of an example panel.
Figure 16:
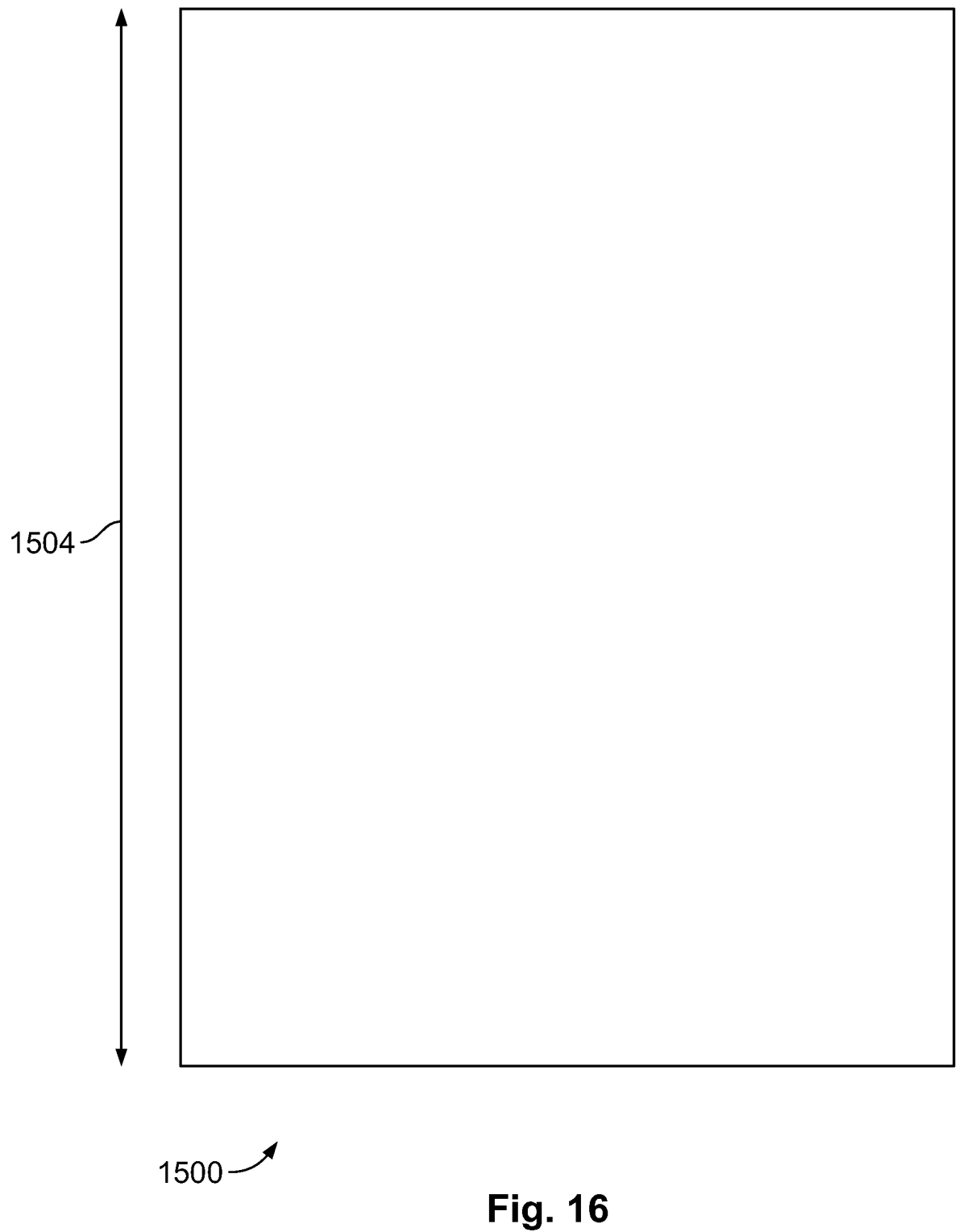
FIG. 16 is a front/rear view of an example panel.

As illustrated in FIG. 5, aspects of the present technology include a first panel 106. First panel 106 may have a panel body, such as panel body 1500 as illustrated in FIGS. 15-16. While illustrated as a cuboidal prism, the panel body 1500 may be of any shape, size, material, features, type or kind, orientation, location, quantity, components, and arrangements of components that would allow the present technologies to fulfill the objectives and intents of the present technology. In particular, the first panel 106 may serve to form a barrier, diffuse and/or soften light, etc. In examples, it is preferred that the first panel 106 be of a material that is tough, strong, durable, impact resistant, shatter-proof, resistant to ultraviolet light, scratch resistant or scratch-proof, resistant to chemicals, abrasion proof, lightweight, transparent, stiff, and/or easily manufacturable. Such a material can include, but is not limited to, the following: PMMA acrylic glass, other similar plastics, and/or a combination of the aforementioned. For some applications, it is preferred that the first panel 106 be of a shape that may be received by the back face of first face 136 of the perimeter ledge 134 of a casing body 122, as described above. In particular, the first panel 106 may have a panel body 1500 with a length 1502 the same as inner perimeter length 502 and a height 1504 similar to an inner perimeter height 504 such that the first panel 106 fits snugly with the casing body 122 of a casing, such as first casing 102. In examples, the first panel 106 may have a panel body 1500 with a width 1506 sized such that multiple panels (e.g., panels 1-7), along with any gaskets and spacers, fit snuggly within the cavity formed by the first casing 102 and the second casing 104. In certain applications, such snug fit reduces movement between the panels when the traffic sign assembly with light-diffusing panel 100 is assembled. In some examples, one or more spacers are used between the panels to create gaps if desired (e.g., to fit circuitry within the traffic sign assembly with light-diffusing panel 100). In examples, the first panel 106 has a body 1500 with a front face 1510 opposite a back face 1530, and the front face 1510 of the first panel 106 robustly coupled to the back face of first face 136 of the perimeter ledge 134, in an orientation illustrated in FIG. 5. Such robust coupling may occur via compression, inference fit, threaded engagement, snap fit, magnetic coupling, hinge connection, latch mechanism, friction fit, resins, adhesives, glues, and the like.

Figure 12A:
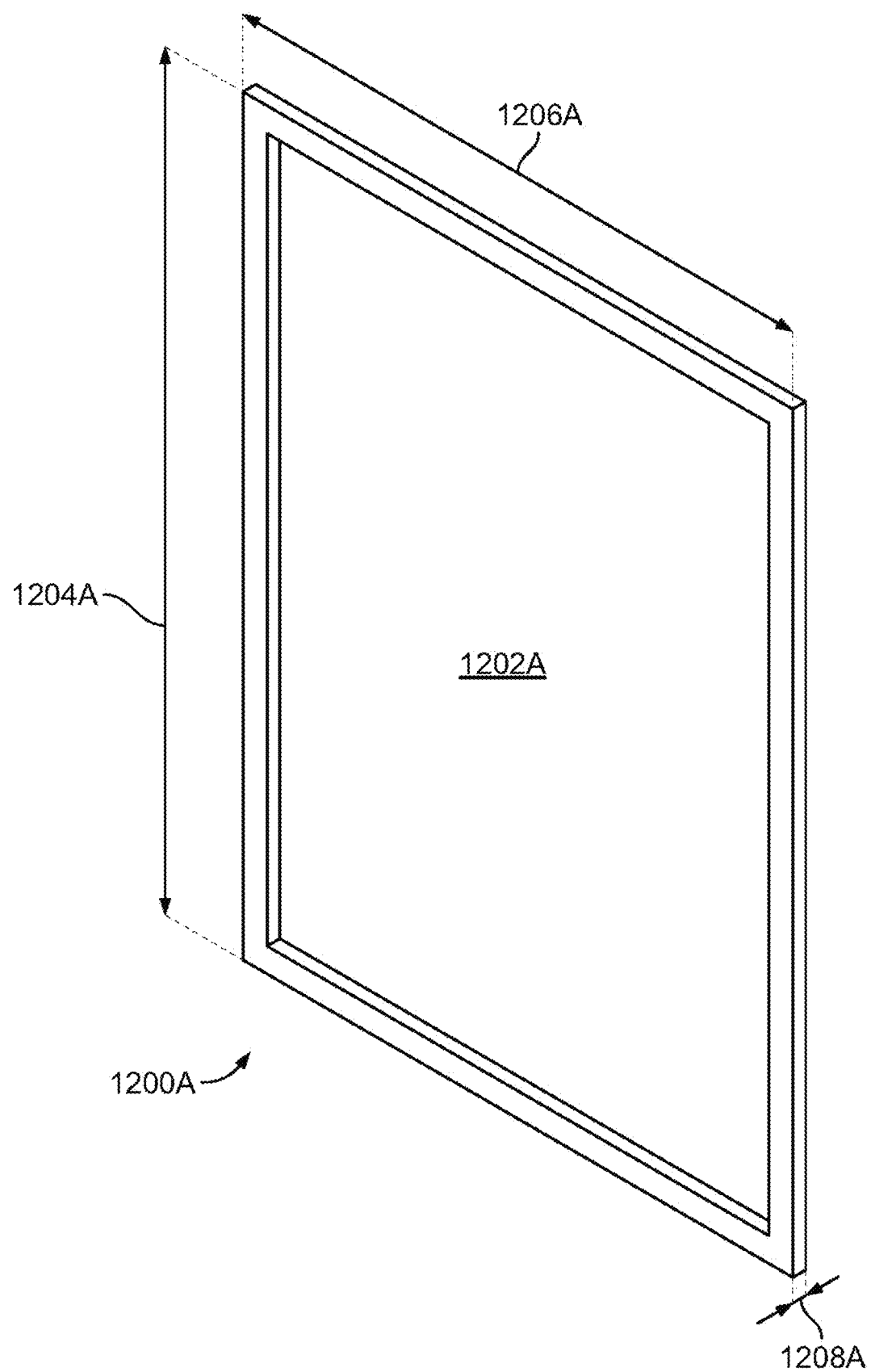
FIG. 12A is a perspective view of an example gasket.
Figure 13:
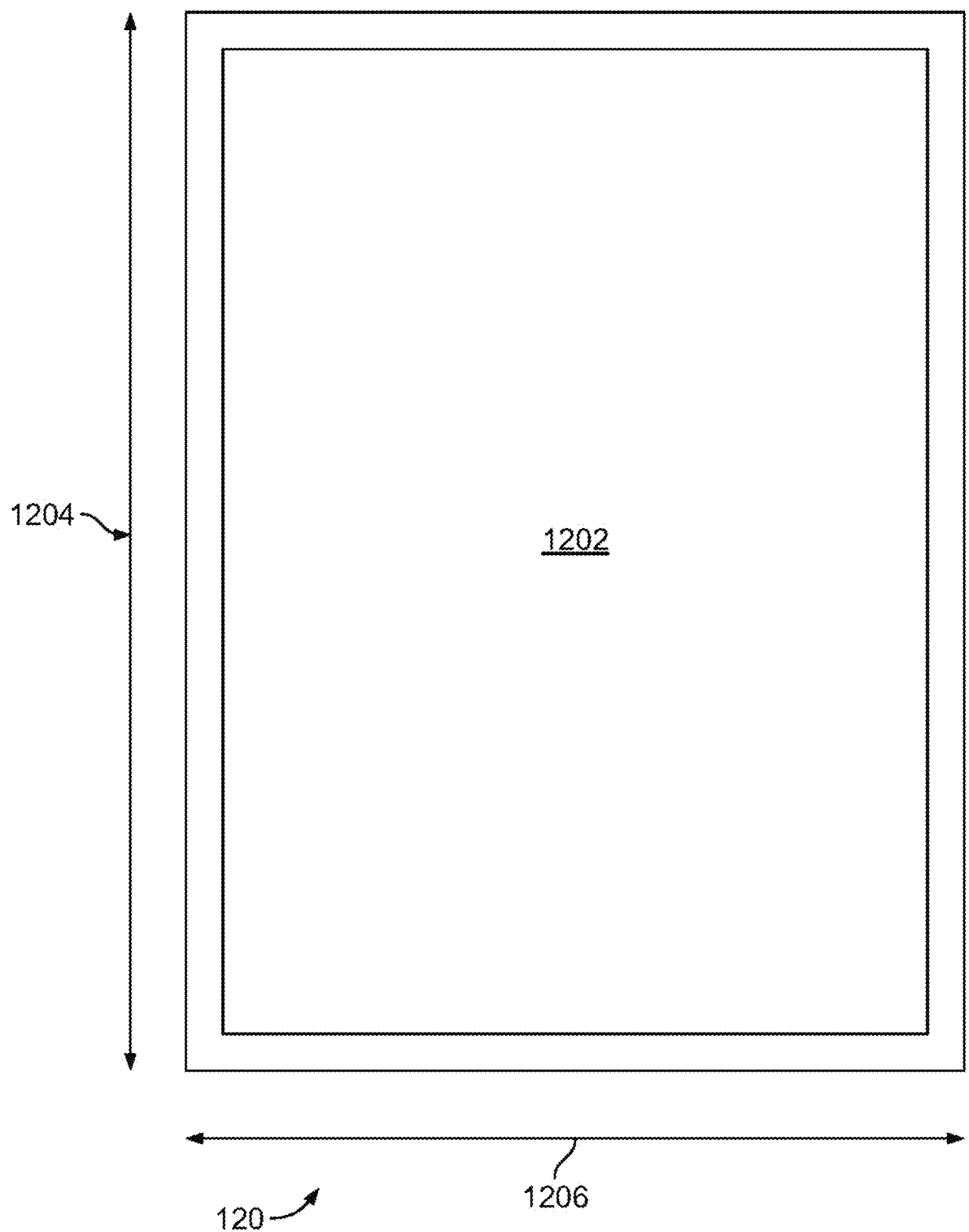
FIG. 13 is a front/rear view of an example gasket.
Figure 14:
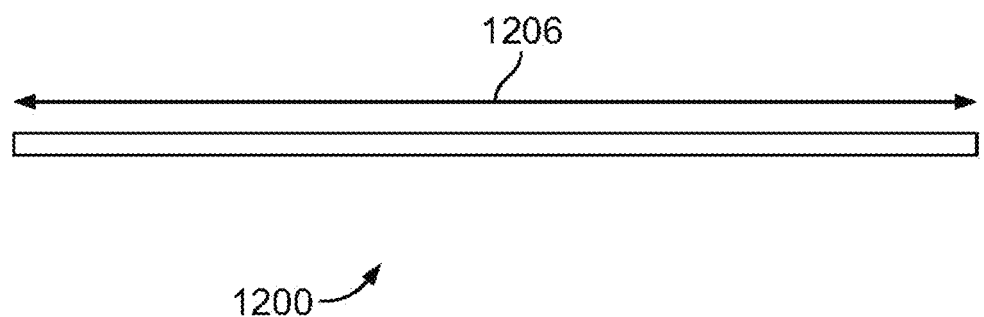
FIG. 14 is a top/bottom view of an example gasket.

As illustrated in FIG. 5 and in FIGS. 12A, 13, and 14, aspects of the present technology include a gasket 120. The gasket 120 may have a gasket body 1200A as illustrated in FIG. 12A. Though illustrated as a cuboidal prism with an opening 1202A, the gasket 120 may be of any shape, size, material, features, type or kind, orientation, location, quantity, components, and arrangements of components that would allow the present technologies to fulfill the objectives and intents of the present technologies. In examples, it is preferred that the gasket body 1200A be of a material that is compatible with the material of the first panel, while also being soft, smooth, non-slip material, non-abrasive, moisture sealing and/or wicking, and/or elastic. In additional/alternative examples, it is preferred that the gasket body 1200A be sized and shaped to have a height 1204A and a length 1206A identical or similar to the inner perimeter height 504 and the inner perimeter length 502 of the casing body 122. This allows, for example, the gasket body 1200A to be disposed between two panels or between a casing and a panel and allow the opening 132 of the casing body to be substantially aligned with opening 1202A. It may be preferred that the gasket opening 1202A be of any shape, size, material, features, type or kind, orientation, location, quantity, components, and arrangements of components that would allow the gasket to fulfill the objectives and intents of the present technology. In examples, the width 1208A of the gasket body 1200A is of a size such that multiple panels (e.g., panels 1-7) along with any other gaskets fit snuggly within the cavity formed by the first casing 102 and the second casing 104 so as to reduce movement between the panels when the traffic sign assembly with light-diffusing panel 100 is assembled. In some examples, one or more spacers are used between the panels to create gaps if desired (e.g., to fit circuitry within the traffic sign assembly with light-diffusing panel 100). As illustrated, the gasket body 1200A is disposed between the first panel 106 and the second panel 108 such that the front face of the gasket 1200A is coupled to the rear face of a first panel 106 when the traffic sign assembly with light-diffusing panel 100 is assembled. Such robust coupling may occur via compression, inference fit, threaded engagement, snap fit, magnetic coupling, hinge connection, latch mechanism, friction fit, resins, adhesives, glues, and the like.

Figure 12B:
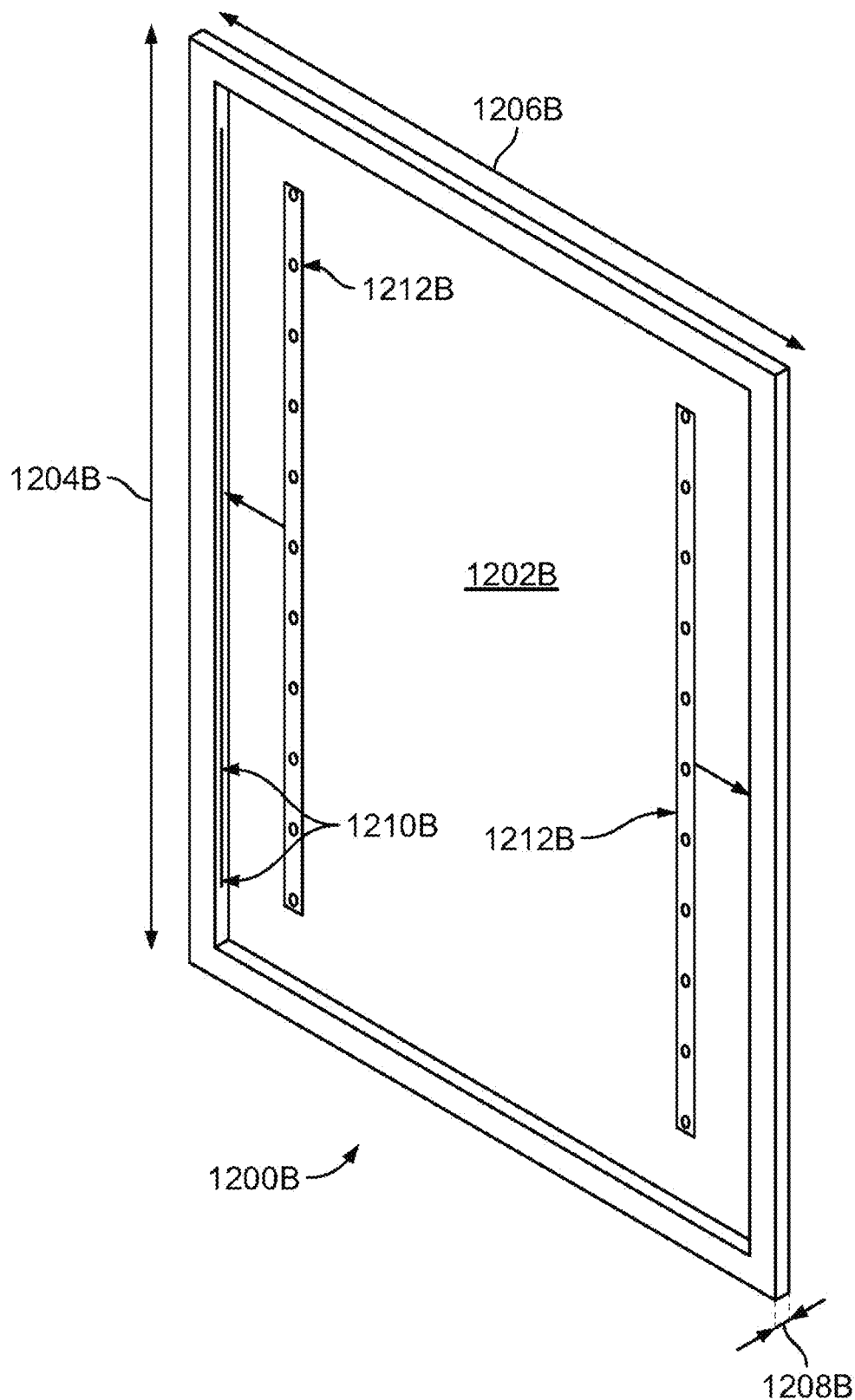
FIG. 12B is a perspective view of an alternative example gasket with light array.

In alternative examples, the gasket 120 may have a gasket body 1200B, as illustrated in FIG. 12B. The gasket body 1200B may be used to integrate one or more of a light array to a panel, such as the light arrays described with reference to FIG. 4. In such an example, the gasket may have receiving elements 1210B to receive a light arrays 1212B, as illustrated in FIG. 12B. The receiving element may be a slit. A power source and circuit for control may be in electronic communication with the light array, such as light arrays 1212B, through a wire or other suitable means (not shown).

As illustrated in FIG. 5, aspects of the present technology include a second panel 108. Second panel 108 may have a panel body, such as panel body 1500 as illustrated in FIGS. 15-16. While illustrated as a cuboidal prism, the panel body 1500 may be of any shape, size, material, features, type or kind, orientation, location, quantity, components, and arrangements of components that would allow the present technologies to fulfill the objectives and intents of the present technology. In particular, the second panel 108 may serve as a light beam filter such that the second panel 108 may adjusts a light beam's angle and shape in order to refocus said light beam to control and flatten the direction of said light beam and reduce/prevent wasted said light beam and potential light pollution. In examples, the second panel 108 may have a panel body 1500 with a width 1506 that is sized such that multiple panels (e.g., panels 1-7) along with any gaskets fit snuggly within the cavity formed by the first casing 102 and the second casing 104. In examples, such snug fit reduces movement between the panels when the traffic sign assembly with light-diffusing panel 100 is assembled. In examples, the second panel 108 has a body 1500 with a front face 1510 and a back face 1512. As illustrated in FIG. 5, a front face 1510 of the second panel 108 is oriented to couple to the back face 1210 of the body of the gasket 120. Such robust coupling may occur via compression, inference fit, threaded engagement, snap fit, magnetic coupling, hinge connection, latch mechanism, friction fit, and the like.

As illustrated in FIG. 5, aspects of the present technology include a third panel 110. Third panel 110 may have a panel body, such as panel body 1500 as illustrated in FIGS. 15-16. While illustrated as a cuboidal prism, the panel body 1500 may be of any shape, size, material, features, type or kind, orientation, location, quantity, components, and arrangements of components that would allow the present technology to fulfill the objectives and intents of the present technology. In particular, the third panel 110 may be of a material similar to and/or compatible with the material of the first panel 106. In examples, the third panel 110 is of a cloudy and/or satin-like finish and of a transparency significantly less than the transparency of the first panel. In examples, these and other features of the third panel 110 result a light-beam-diffuser third panel 110 that is capable of softening a light beam to reduce and/or remove glare, hot spots, and/or shadows. For some applications, it is preferred that the third panel 110 be of a shape that may align with the back of the second panel 108, as described above. As illustrated, the third panel 110 is disposed between the second panel 108 and the fourth panel 112 such that the front face of third panel 110 is coupled to the rear face of the second panel 108 when the traffic sign assembly with light-diffusing panel 100 is assembled. Such robust coupling may occur via compression, inference fit, threaded engagement, snap fit, magnetic coupling, hinge connection, latch mechanism, friction fit, resins, adhesives, glues, and the like.

Figure 17A:
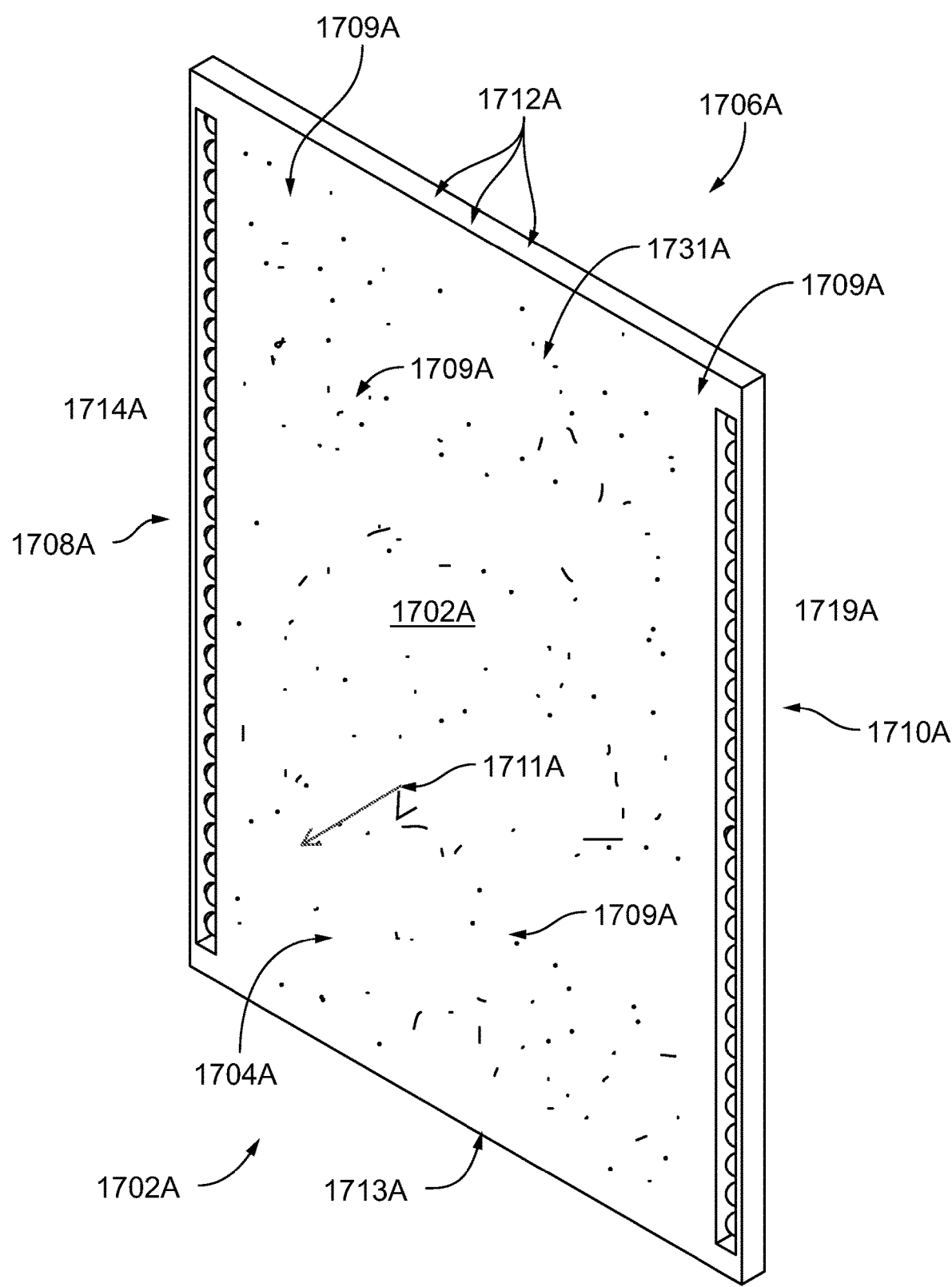
FIG. 17A is a perspective view of an example of a light-diffusing panel.

As illustrated in FIG. 5 and in FIGS. 17A, 18A, 19A, and 20A, aspects of the present technology include a fourth panel 112. In examples, the fourth panel 112 includes a panel body 1702A having front face 1704A and a back face 1706A, a first side 1708A opposite a second side 1710A, and a topside 1712A opposite a bottom side 1713A. As illustrated in FIG. 17A, a first light array 1714A is disposed within the fourth panel body 1702A proximate to the first side 1708A, and disposed proximate to second side 1710A is a second light array 1719A. While illustrated as a cuboidal prism, panel body 1702A may be of any shape, size, material, features, type or kind, orientation, location, quantity, components, and arrangements of components that would allow the present fourth panel to fulfill the objectives and intents of the technology disclosed herein. In examples, the fourth panel body 1702A has a height 1718A and a length 1720A that is the same or similar to that of the panels 1-3 and 5-7. In examples, the fourth panel body 1702A may be of a material similar to and/or compatible with the material of the first panel 106. In further examples, the front face 1704A and the back face 1706A are relatively smooth surfaces. As illustrated, the fourth panel 112 is disposed between the third panel 110 and the fifth panel 114 such that the front face 1704A of fourth panel body 1702A is coupled to the rear face of the third panel 110 when the traffic sign assembly with light-diffusing panel 100 is assembled. Such robust coupling may occur via compression, inference fit, threaded engagement, snap fit, magnetic coupling, hinge connection, latch mechanism, friction fit, resins, adhesives, glues, and the like.

In examples, a fourth panel assembly 1760B may be the fourth panel 112. Fourth panel assembly 1760B is illustrated in FIGS. 17B, 18B, 19B, and 20B. As illustrated in said figures, the fourth panel assembly 1760B includes a panel body 1702B having a front face 1704B and a back face 1706B, a first side 1708B opposite a second side 1710B, and a topside 1712B opposite a bottom side 1713B. A first light array 1714B is integrated into a first side of a gasket 1750B and is coupled to the first side 1708B to form a fourth panel assembly 1760B. The fourth panel assembly 1760B may include a second light array (not shown) that is disposed within a second side of a gasket 1752B and is coupled to a second side 1710B. While illustrated as a cuboidal prism, panel body 1702B may be of any shape, size, material, features, type or kind, orientation, location, quantity, components, and arrangements of components that would allow the present fourth panel 1702B to fulfill the objectives and intents of the technology disclosed herein. In the example illustrated in FIG. 17B, the fourth panel body 1702B has a height 1718B and a length 1720B less than panels 1-3 and 5-7 to accommodate the gasket such that the fourth panel assembly 1760B has a height 1762B and a length 1764B that is the same or similar to that of the height and width of panels 1-3 and 5-7. In examples, the fourth panel body 1702B be of a material similar to and/or compatible with the material of the first panel. In further examples, the front face 1704B and the back face 1706B are relatively smooth surfaces. The fourth panel assembly 1760B may be disposed between the third panel 110 and the fifth panel 114 such that the front face 1704B of fourth panel assembly 1760B is coupled to the rear face of the third panel 110 when the traffic sign assembly with light-diffusing panel 100 is assembled. Such robust coupling may occur via compression, inference fit, threaded engagement, snap fit, magnetic coupling, hinge connection, latch mechanism, friction fit, resins, adhesives, glues, and the like.

In examples, the fourth panel body 1702A and fourth panel body 1702B comprises a plurality of particles 1709A and 1709B, respectively. In aspects of the technology, the plurality of particles 1709A and 1709B may be of any shape, size, material, features, type or kind, orientation, location, quantity, components, and arrangements of components that would allow the particles 1709A and 1709B to fulfill the objectives and intents of the present technology. However, it may be preferred that the plurality of particles 1709A and 1709B be a material, type or kind, features, and/or components such that a light beam from the first light array and the second light array can be transformed into a light beam that is of a smooth and/or evenly dispersed illumination, which may be reflected and/or redirected towards the front of the traffic sign assembly (i.e., directed generally parallel to a vector 1711A and/or 1711B perpendicular to the plane of the fourth panel body and towards the first casing 102). This may occur with the use of a plurality of particles that may be interspersed through the panel body 1702A and/or 1702 B. Further, the plurality of particles 1709 may be located within and/or dispersed throughout the fourth panel 112 such that the plurality of particles 1709A and 1709B causes all or some portion of a light beam to be reflected, scattered, and/or redirected towards the front of the traffic sign (i.e., directed generally parallel to a vector 1711 perpendicular to the plane of the fourth panel and towards the first casing 102). In examples, the plurality of particles is dispersed within a polymeric matrix of the body of the fourth panel. The plurality of particles may include at least one of a material selected from the group consisting of: an inorganic opacifier, BaSO4, TiO2, polymeric silicone, and a polybutylacrylate-based material. In examples, the particles are substantially spherical and the size of the particles are between 1.0 μm to 20.0 μm.

Figure 17B:
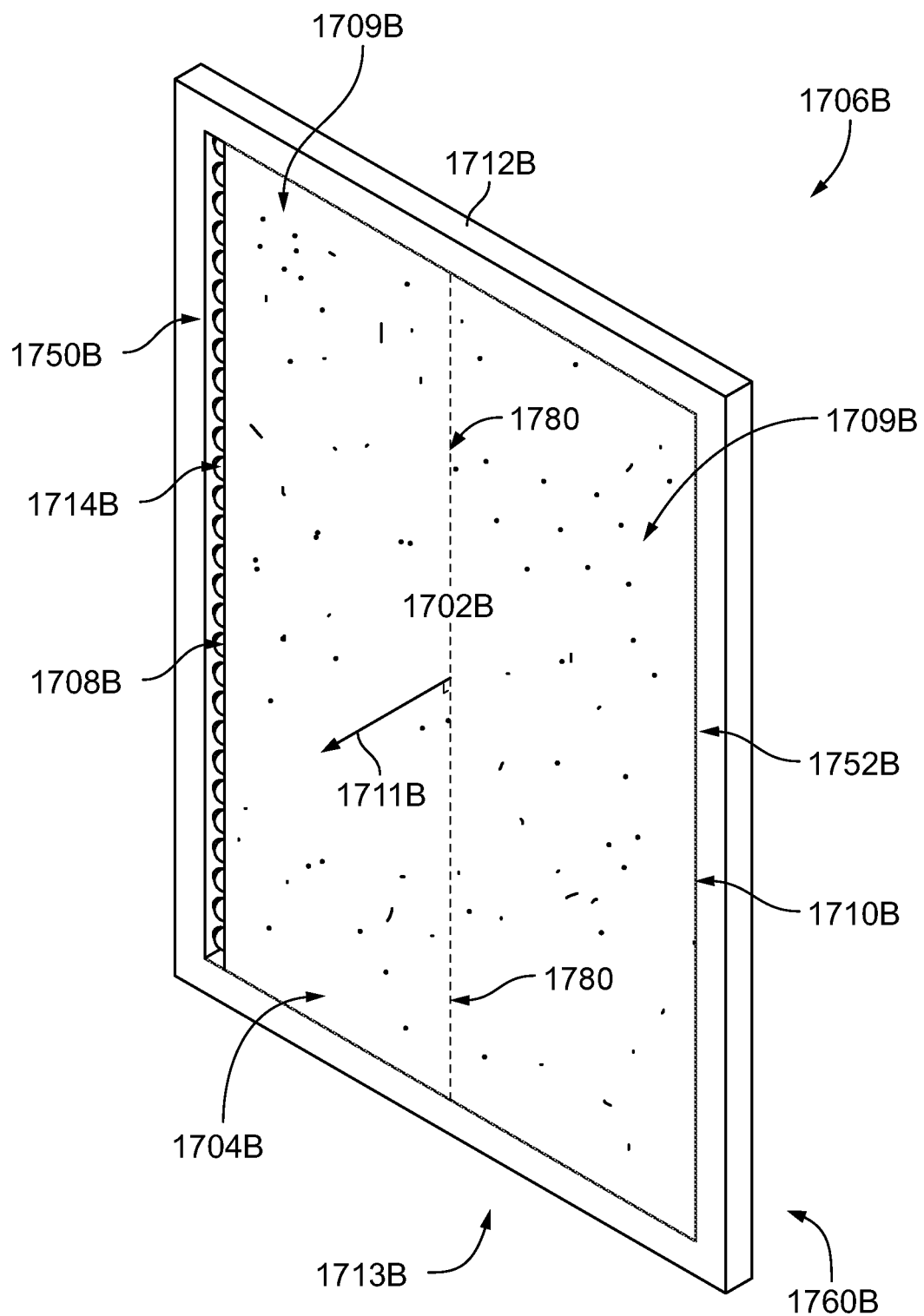
FIG. 17B is a perspective view of an alternative example of a light-diffusing panel.
Figure 18A:
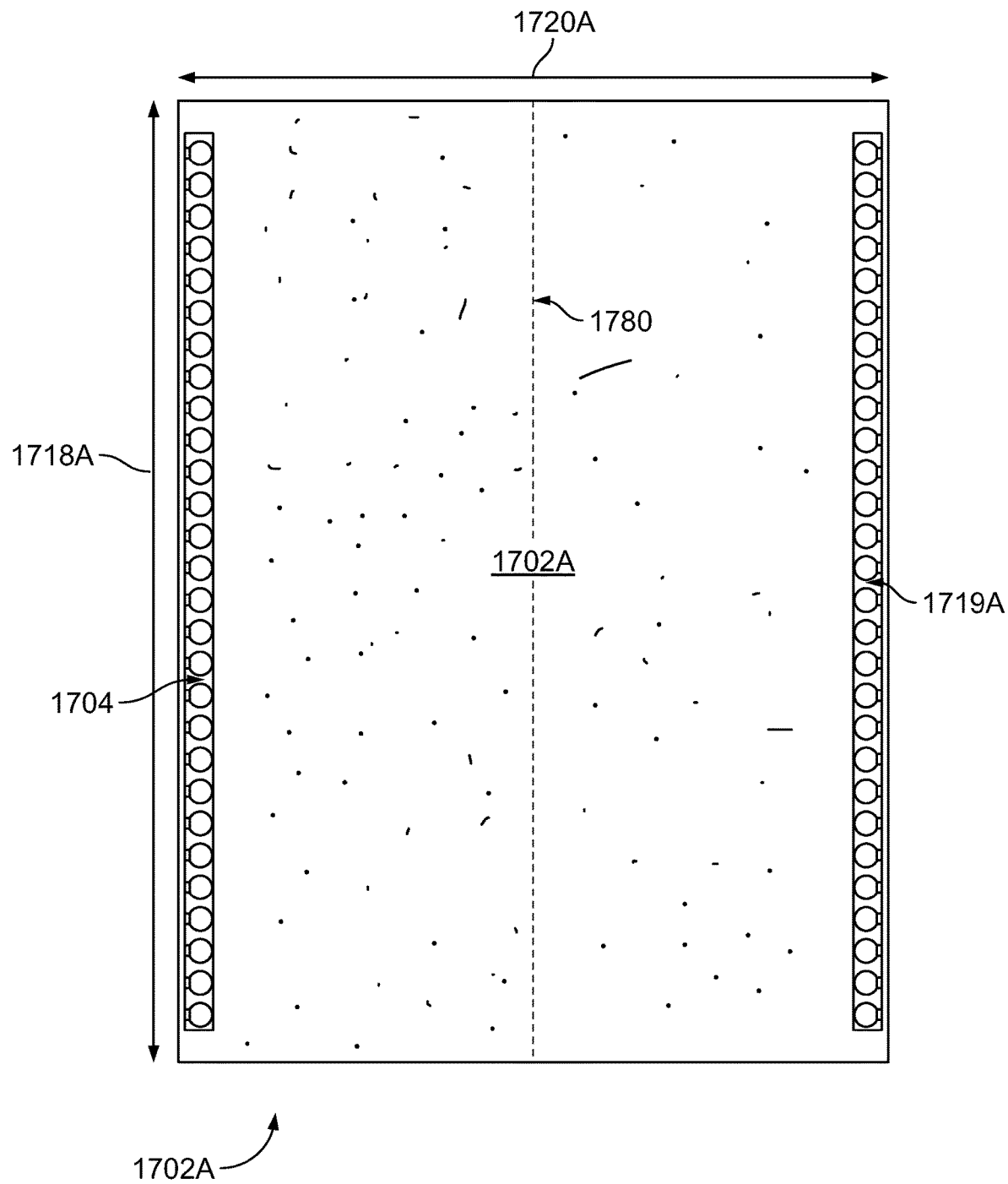
FIG. 18A is a front/rear view of an example of a light-diffusing panel.
Figure 18B:
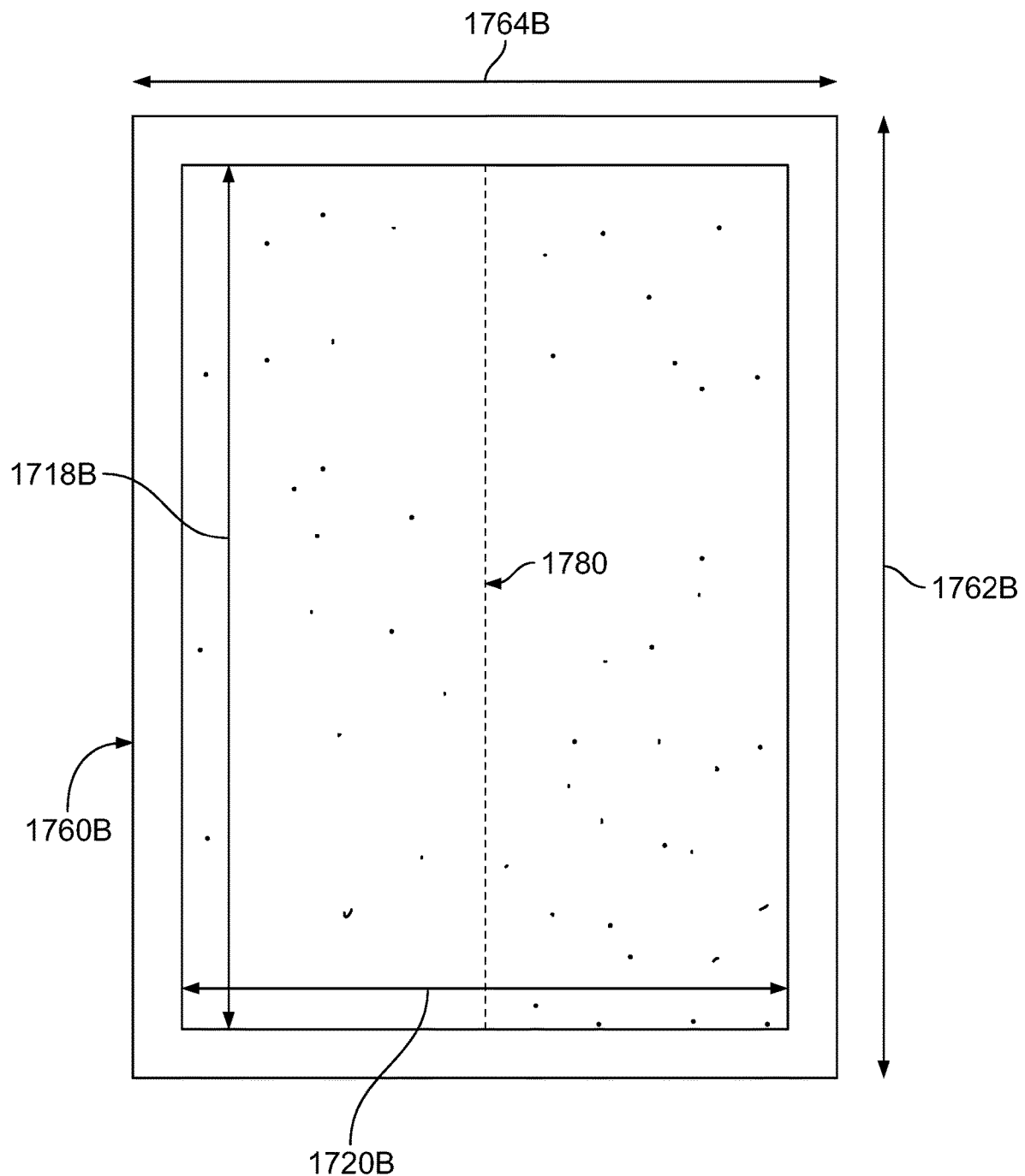
FIG. 18B is a front/rear view of an alternative example of a light-diffusing panel.
Figure 19A:
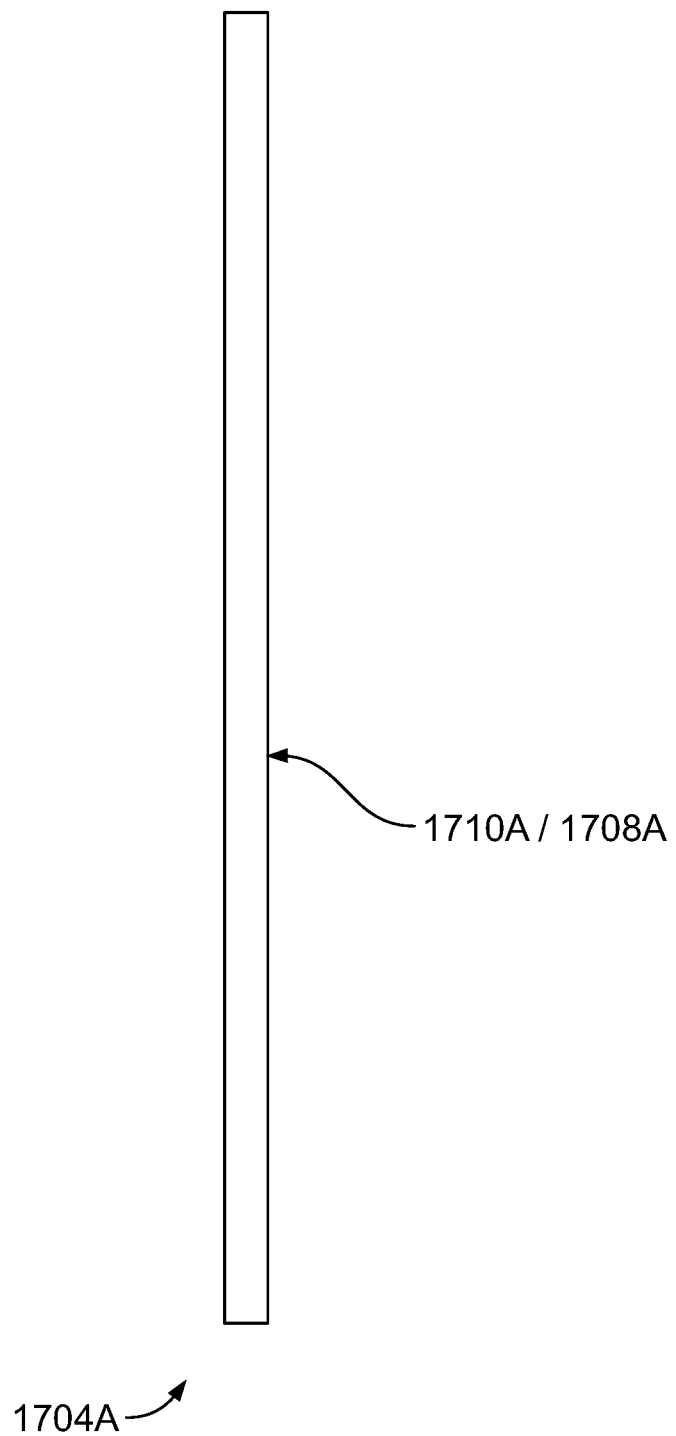
FIG. 19A is a right/left side view an example of a light-diffusing panel.
Figure 19B:
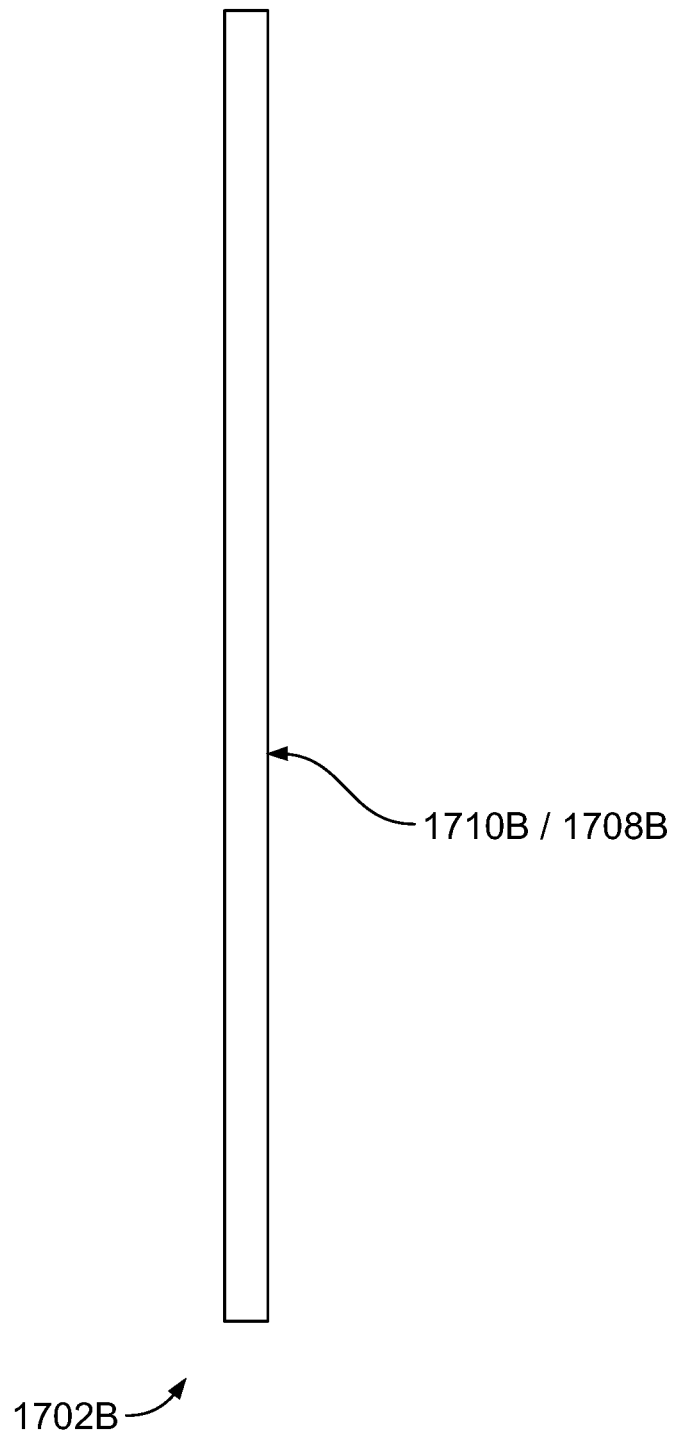
FIG. 19B is a right/left side view of an alternative example of a light-diffusing panel.
Figure 20A:
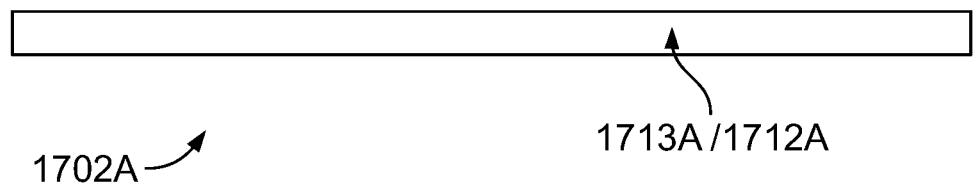
FIG. 20A is a top/bottom view of an alternative example of a light-diffusing panel.
Figure 20B:
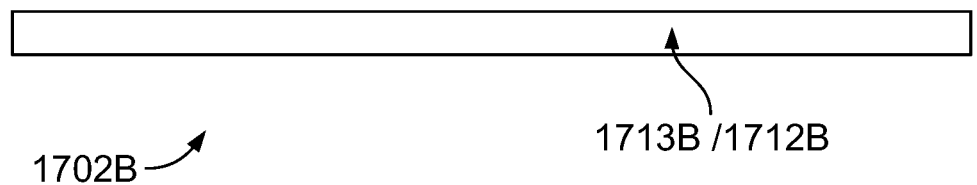
FIG. 20B is a top/bottom view of an alternative example of a light-diffusing panel.

As illustrated, the fourth panel 112 includes a first light array (illustrated as an integrated light panel FIG. 17A and coupled as illustrated in FIG. 17B). The first light array 1714A and 1714B may be of any shape, size, material, features, type or kind, orientation, location, quantity, components, and arrangements of components that would allow aspects of the present technology to fulfill the objectives and intents of the present technology. However, it can be preferred that the first light array 1714A and 1714B be of a material that is compatible with the material of the technology. In examples, it is preferred that the first light array be located on a side face of the fourth panel 112. It may also be preferred that the first light array 1714A and 1714B be of a length and height similar to the length and height of the fourth panel body 1702A or panel assembly 1702B. In additional/alternative examples, it is preferred that the first light array 1714A and 1714B be of a width 1721 similar to the width of the fourth panel body 1702A or panel assembly 1702B. The first light array 1714A and 1714B may include a first plurality of light emitting devices. The first plurality of light emitting devices may be of any shape, size, material, features, type or kind, orientation, location, quantity, components, and arrangements of components that would allow the present light array and other aspects of the technology to fulfill the objectives and intents of the present technology. In particular examples, it is preferred that the first plurality of light emitting devices be orientated such that the first plurality of light emitting devices emit light beams towards a center line 1780 of the fourth panel 112 from the side face of the fourth panel on which the first light array is located. In examples, the some or all of the light is substantially directed toward the center line 1780 parallel to the face of the fourth panel. It may be preferred that the first plurality of light emitting devices be of the type or kind, features, components similar to, but not limited to, the following: light emitting diodes, organic light emitting diodes, light bulbs, liquid crystal displays, and other similarly related devices.

As illustrated, the fourth panel 1702A and panel assembly 1702B include a second light array (illustrated as an integrated light array 1719A in FIG. 17A and a coupled light array 1719B in FIG. 17B). The second light array 1719A and 1719B may be of any shape, size, material, features, type or kind, orientation, location, quantity, components, and arrangements of components that would allow aspects of the present technology to fulfill the objectives and intents of the present technology. However, it can be preferred that the second light array 1719A and 1719B be of a material that is compatible with the material of the technology. In examples, it is preferred that the second light array 1719A and 1719B array be located on a side face of the fourth panel 112 and 112B, respectively. It may be preferred the second light array 1719A and 1719B be of a length and height similar to the length and height of the fourth panel 112 and 112B, respectively. In additional/alternative examples, it is preferred that the second light array 1719A and 1719B be of a width 1721A/1721B (respectively) similar to the width of the fourth panel 112/112B. The second light array 1719A and 1719B may include a first plurality of light emitting devices. The second plurality of light emitting devices may be of any shape, size, material, features, type or kind, orientation, location, quantity, components, and arrangements of components that would allow the present light array and other aspects of the technology to fulfill the objectives and intents of the present technology. In particular examples, it is preferred that the second plurality of light emitting devices be orientated such that the second plurality of light emitting devices emit light beams towards a center line 1780 of the fourth panel body 1702A or panel assembly 1702B from the side of the fourth panel body 1702A or panel assembly 1702B on which the second light array is located. In examples, the some or all of the light is substantially directed toward the center line 1780, which is parallel to the face of the fourth panel. It may be preferred that the second plurality of light emitting devices be of the type or kind, features, components similar to, but not limited to, the following: light emitting diodes, organic light emitting diodes, light bulbs, liquid crystal displays, and other similarly related devices.

As illustrated in FIG. 5, aspects of the present technology include a fifth panel 114. Fifth panel 114 may have a panel body, such as panel body 1500 as illustrated in FIGS. 15-16 While illustrated as a cuboidal prism, the panel body 1500 may be of any shape, size, material, features, type or kind, orientation, location, quantity, components, and arrangements of components that would allow the present technology to fulfill the objectives and intents of the present technology. In particular, the fifth panel 114 may be of a material similar to and/or compatible with the material of the first panel 106. In examples, the fifth panel 114 has features or is of a type or kind similar to a heat and/or moisture shield. For some applications, it is preferred that the fifth panel 114 be of a shape that may align with the back of the fourth panel 112, as described above. As illustrated, the fifth panel 114 is disposed between the fourth panel 112 and the sixth panel 116 such that the front face of fifth panel 114 is coupled to the rear face of the fourth panel 112 when the traffic sign assembly with light diffusing panel 100 is assembled. Such robust coupling may occur via compression, inference fit, threaded engagement, snap fit, magnetic coupling, hinge connection, latch mechanism, friction fit, resins, adhesives, glues, and the like.

As illustrated in FIG. 5, aspects of the present technology include a sixth panel 116. Sixth panel 116 may have a panel body, such as panel body 1500 as illustrated in FIGS. 15-16. While illustrated as a cuboidal prism, the panel body 1500 may be of any shape, size, material, features, type or kind, orientation, location, quantity, components, and arrangements of components that would allow the present technology to fulfill the objectives and intents of the present technology. In particular, the sixth panel 116 may be of a material similar to and/or compatible with the material of the first panel 106. In examples, the sixth panel 116 has features or is similar to a reflector to force, cause, or allow a light beam to exit towards to and at the front of the traffic sign with light diffusion panel 100. For some applications, it is preferred that the sixth panel 116 be of a shape that may align with the back of the fifth panel 114, as described above. As illustrated, the sixth panel 116 is disposed between the fifth panel 114 and the seventh panel 118 such that the front face of the sixth panel 116 is coupled to the rear face of the fifth panel 114 when the traffic sign assembly with light diffusing panel 100 is assembled. Such robust coupling may occur via via compression, inference fit, threaded engagement, snap fit, magnetic coupling, hinge connection, latch mechanism, friction fit, resins, adhesives, glues, and the like.

As illustrated in FIG. 5, aspects of the present technology include a seventh panel 118. Seventh panel 118 may have a panel body, such as panel body 1500 as illustrated in FIGS. 15-16. While illustrated as a cuboidal prism, the panel body 1500 may be of any shape, size, material, features, type or kind, orientation, location, quantity, components, and arrangements of components that would allow the present technology to fulfill the objectives and intents of the present technology. In particular, the seventh panel 118 may be of a material similar to and/or compatible with the material of the first panel 106. In examples, the seventh panel 118 is or includes features similar to or of a thermal heat foil such that the seventh panel 118 can reduce heat transfer towards the rear face of the present technology while providing additional cushion and/or protection to the first panel 106 through the sixth panel 116 of the traffic sign with light diffusion panel 100. For some applications, it is preferred that the seventh panel 118 be of a shape that may align with the back of the sixth panel 116, as described above. As illustrated, the seventh panel 118 is disposed behind the sixth panel 116. For some applications, it is preferred that the seventh panel 118 be of shape that may be received by the back face of first face 136 of the perimeter ledge 134 of a casing body 122 of a second casing 104, as described above. In particular, the seventh panel 118 may have a panel body 1500 with a length 1502 the same as inner perimeter length 502 and a height 1504 similar to an inner perimeter height 504 such that the seventh panel 118 couples robustly with the casing body 122 of a casing, such as second casing 104. In examples, the seventh panel 118 has a body 1500 with a front face 1510, and the front face 1510 of the first panel 106 robustly coupled to the back face of first face 136 of the perimeter ledge 134, in an orientation illustrated in FIG. 5. Such robust coupling may occur via compression, inference fit, threaded engagement, snap fit, magnetic coupling, hinge connection, latch mechanism, friction fit, resins, adhesives, glues, and the like.

Aspects of the present technology may also include a circuit board in electronic communication with the one or more light arrays and/or lighting elements described herein. The circuit board may be of any shape, size, material, features, type or kind, orientation, location, quantity, components, and arrangements of components that would allow the various lighting element and light arrays to be controlled. However, it can be preferred that the circuit board be located within or affixed to the traffic sign assembly with light diffusing panel 100 such that the circuit board can be accessed and be within proximity to the first light array and the second light array and/or other lighting elements of the traffic sign assembly 100. The circuit may contain software and firmware applications. The application may be of any shape, size, material, features, type or kind, orientation, location, quantity, components, and arrangements of components that would allow the present application to control the light arrays and/or the lighting elements. However, it may be preferred that the application be of the type or kind, features, and/or components such that the application can control the various properties of a light beam from the plurality of light emitting devices; such properties including, but not limited to, the following: intensity, brightness, level of white color, color, length or duration of use, rhythm, and/or other similarly-related properties. The circuit board may also include or be in electronic communication with a power source. The power source may be of any shape, size, material, features, type or kind, orientation, location, quantity, components, and arrangements of components that would allow the present technology to fulfill the objectives and intents of the present technology. However, it may be preferred that the power source be of the type or kind, components, and/or features similar to, but not limited to, the following: battery cells, solar energy panels, other similarly related objects, and/or any combination of the above-mentioned. The circuit board can contain a plurality of sensors. The plurality of sensors can be of any shape, size, material, features, type or kind, orientation, location, quantity, components, and arrangements of components that would allow the present technology to fulfill the objectives and intents of the present technology. However, it can be preferred that the plurality of sensors be of the type or kind, features, and/or components similar to, but not limited to, the following: photoelectric sensor, photodetector, any other similarly-related objects, and/or any combination of thereof.

Although the innovative technologies have been explained in relation to various examples and embodiments, it is to be understood that many other possible modifications and variations can be made without departing from the spirit and scope of the disclosed technology. Indeed, one skilled in the art will appreciate the foregoing detailed description is provided by way of illustration and not limitation. The examples presented herein are intended to facilitate a clear understanding of the innovative technologies disclosed, and they are not exhaustive of the potential embodiments or examples encompassed by the scope of this disclosure. Those skilled in the art will readily recognize alternative implementations and variations that remain within the broad principles of the innovative technologies described herein. Therefore, it should be understood that the scope of the present disclosure encompasses all such modifications and alternative/additional embodiments and examples as fall within the true spirit and scope of the appended claims.

The invention claimed is:

1. A traffic sign assembly comprising:
   a first panel having a first panel back side and a first panel front side coupled to a housing body, wherein the housing body has an edge with a first face operatively configured to receive the first panel;
   a second panel having a second panel back side and a second panel front side coupled to the first panel back side;
   a third panel having a third panel back side and a third panel front side coupled to the second panel back side;
   a fourth panel having a fourth panel back side and a fourth panel front side coupled to the third panel back side, wherein the fourth panel comprises a plurality of particles disposed within a body of the fourth panel;
   at least one light array integrated into the body of the fourth panel or coupled to the body of the fourth panel such that light from the light array is directed toward the center of the body of the fourth panel;
   a fifth panel having a fifth panel back side and a fifth panel front side coupled to the fourth panel back side;
   a sixth panel having a sixth panel back side and a sixth panel front side coupled to the fifth panel back side; and
   a seventh panel having a seventh panel back side and a seventh panel front side coupled to the sixth panel back side.

2. The traffic sign assembly of claim 1, wherein the housing body comprises a first housing body half and a second body half coupled together to form the housing body.

3. The traffic sign assembly of claim 1, wherein the at least one light array comprises:
   a first light array disposed within a gasket and coupled to a first side of the fourth panel; and a second light array disposed within the gasket and coupled to a second side of the fourth panel.

4. The traffic sign assembly of claim 1, further comprising a thin-film disposed on the front side of the second panel or the front side of the third panel.

5. The traffic sign assembly of claim 1, wherein the plurality of particles comprises an inorganic opacifier, $BaSO_4$, $TiO_2$, polymeric silicone, and a polybutylacrylate-based material.

6. The traffic sign assembly of claim 5, wherein the plurality of particles are substantially spherical having a size between 1.0 μm to 20.0 μm.

7. The traffic sign assembly of claim 1, wherein the first panel is PMMA acrylic.

8. The traffic sign assembly of claim 7, wherein the second panel is a light beam filter or diffuser.

9. The traffic sign assembly of claim 8, wherein the third panel is a light beam filter or diffuser.

10. The traffic sign assembly of claim 9, wherein the fifth panel is a heat or moisture shield.

11. The traffic sign assembly of claim 10, wherein the sixth panel is a reflector to reflect light toward a front of the traffic sign assembly.

12. The traffic sign assembly of claim 11, wherein the seventh panel is a thermal heat foil.

* * * * *